April 13, 1937.  F. W. HOBAN  2,076,564
CHECK OPERATED VENDING APPARATUS
Filed Aug. 15, 1933   12 Sheets-Sheet 1

INVENTOR
Fairfield W. Hoban
BY
Charles H. Kesler
ATTORNEY

April 13, 1937.  F. W. HOBAN  2,076,564
CHECK OPERATED VENDING APPARATUS
Filed Aug. 15, 1933  12 Sheets-Sheet 2

INVENTOR
Fairfield W. Hoban
BY
Charles H Kesler
ATTORNEY

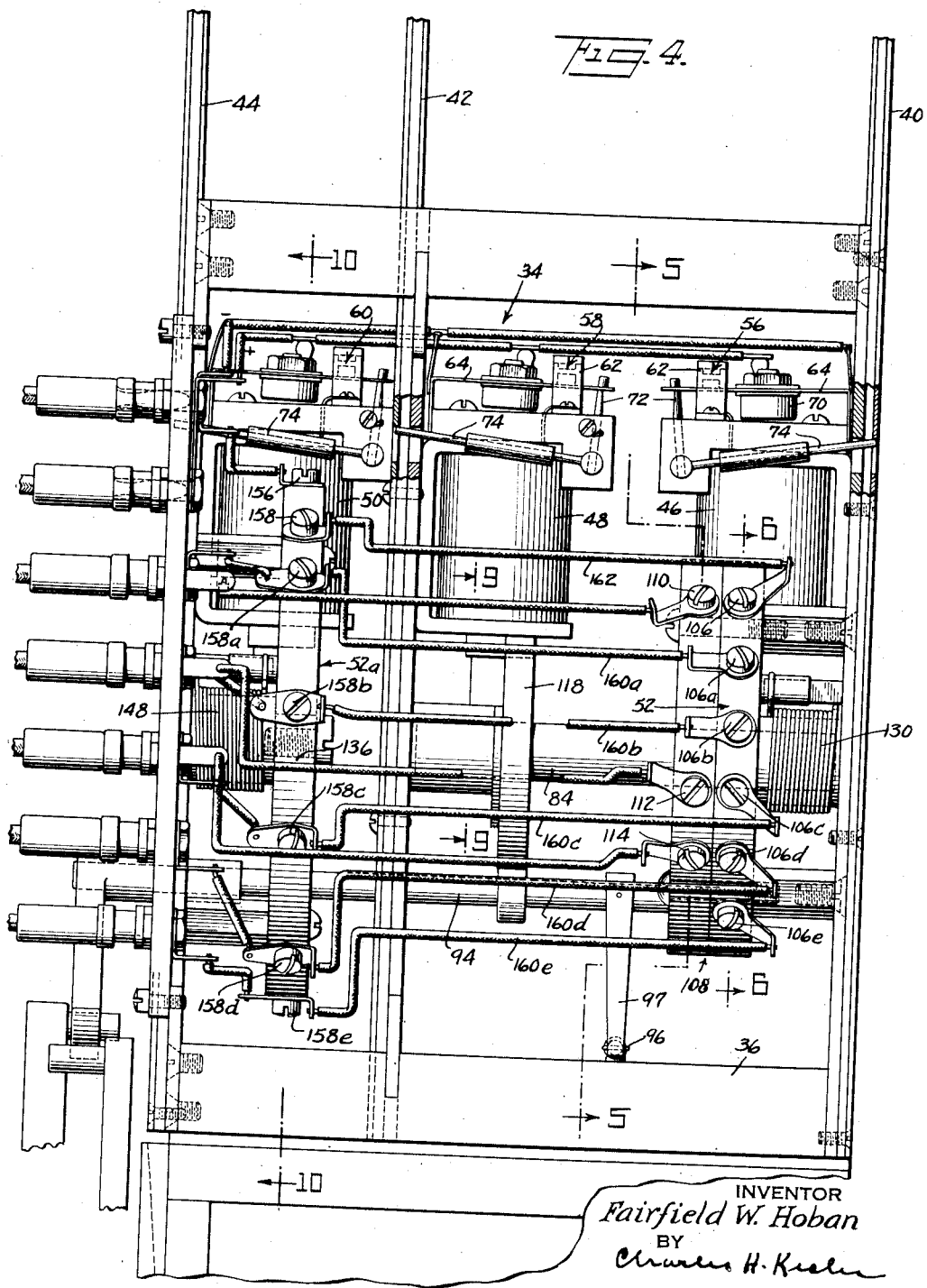

April 13, 1937.  F. W. HOBAN  2,076,564
CHECK OPERATED VENDING APPARATUS
Filed Aug. 15, 1933  12 Sheets-Sheet 5
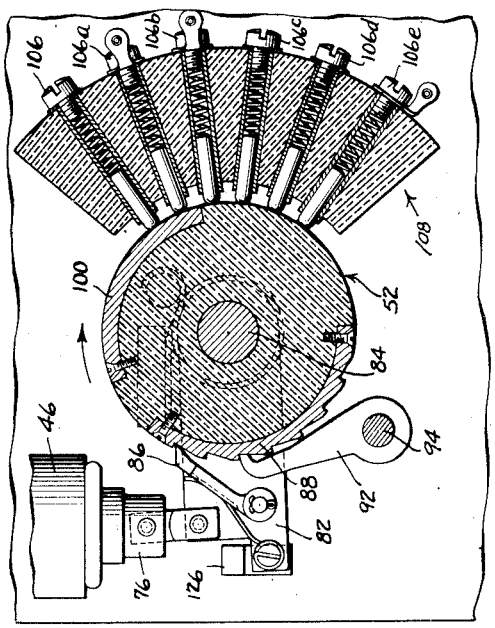
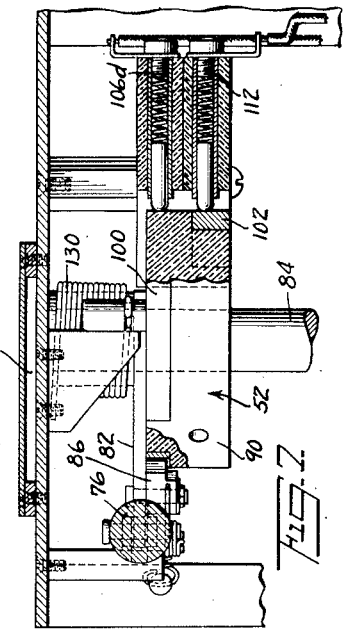
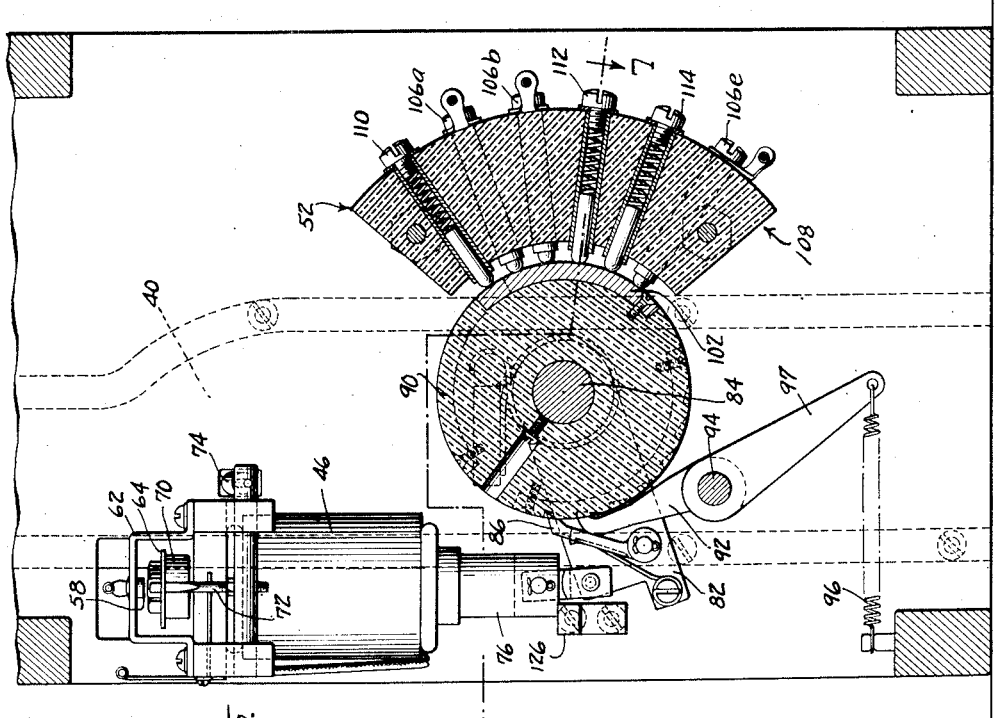
INVENTOR
*Fairfield W. Hoban*
BY
ATTORNEY April 13, 1937.   F. W. HOBAN   2,076,564
CHECK OPERATED VENDING APPARATUS
Filed Aug. 15, 1933   12 Sheets-Sheet 6
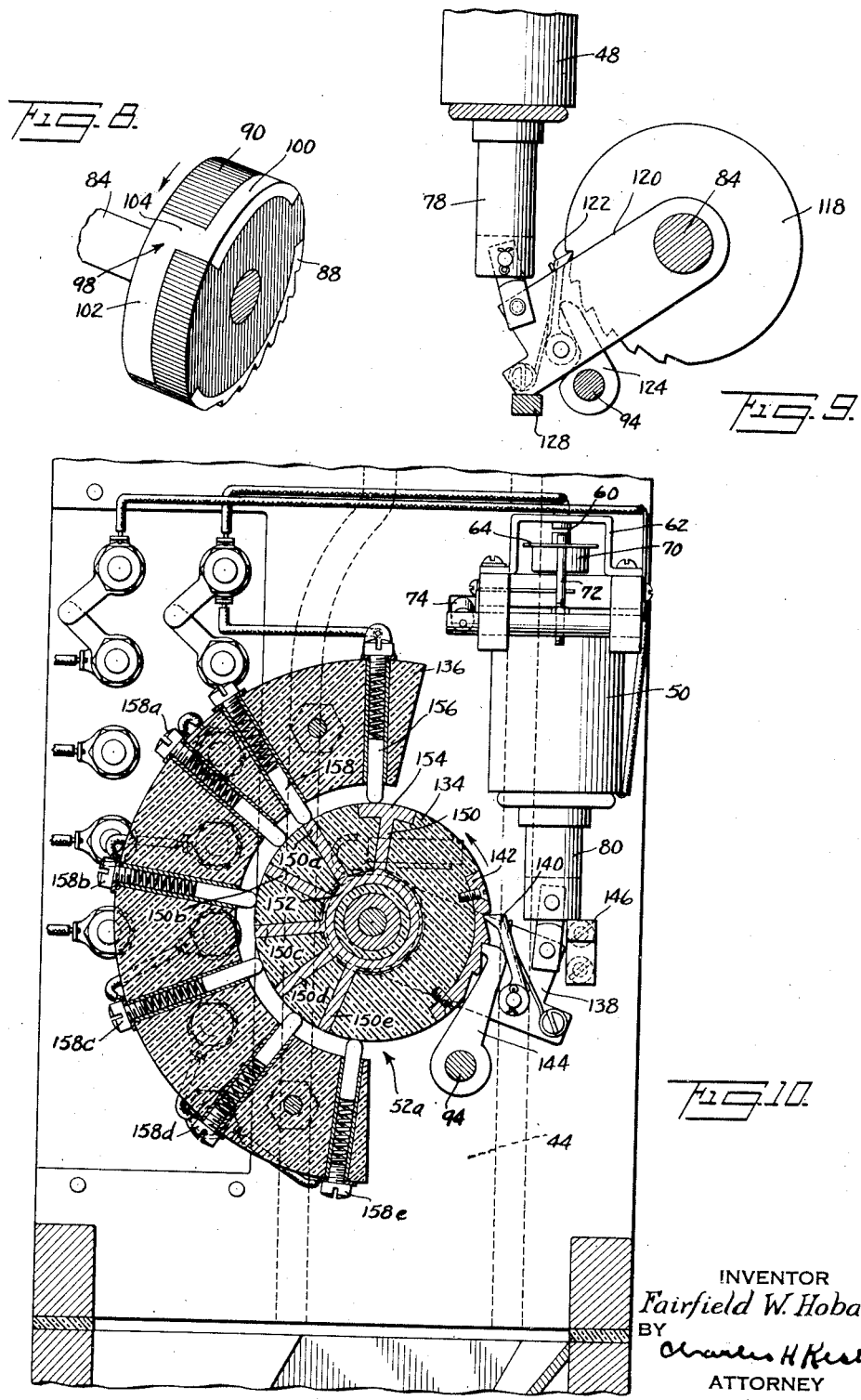

April 13, 1937.  F. W. HOBAN  2,076,564
CHECK OPERATED VENDING APPARATUS
Filed Aug. 15, 1933  12 Sheets-Sheet 7
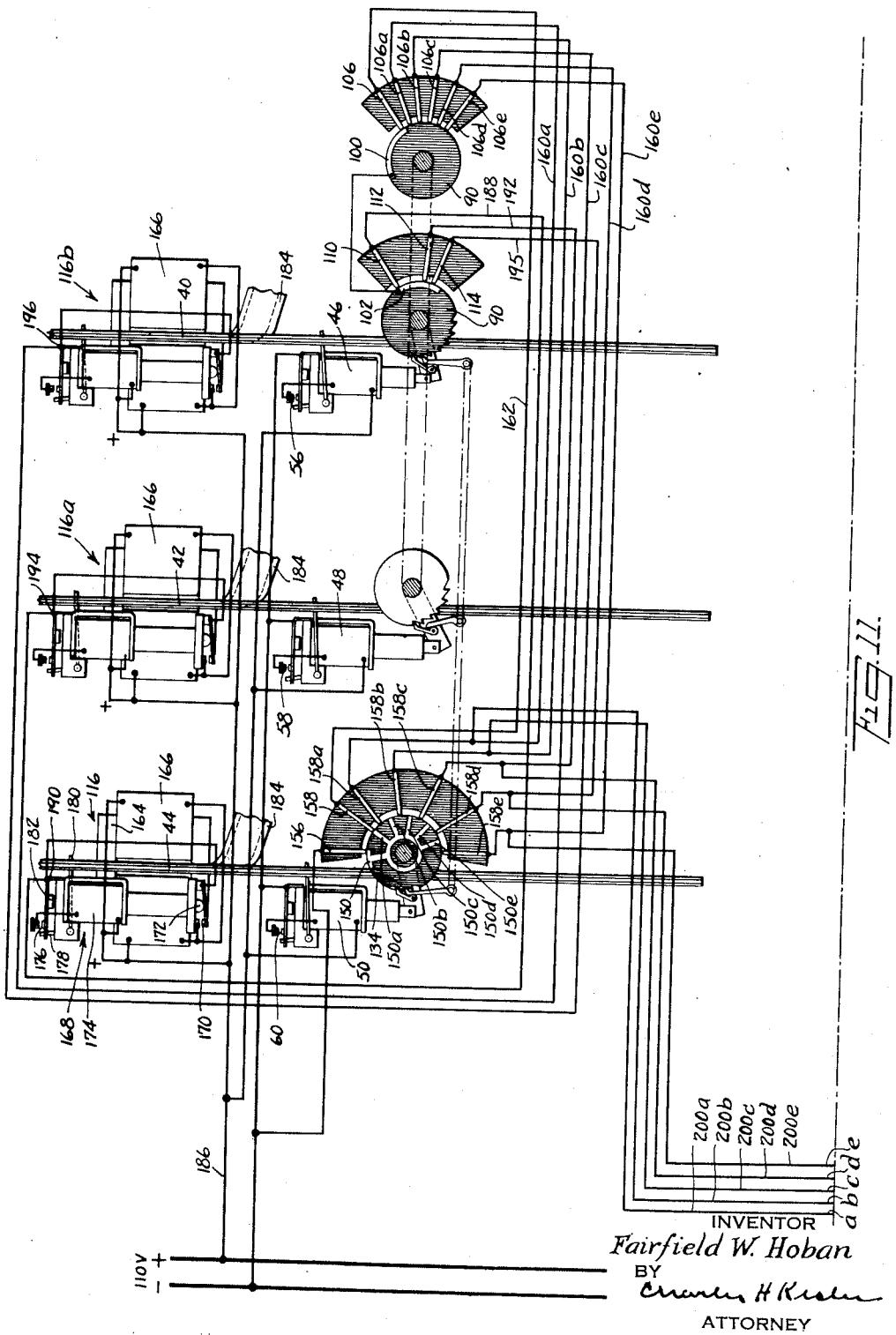
INVENTOR
*Fairfield W. Hoban*
BY
ATTORNEY

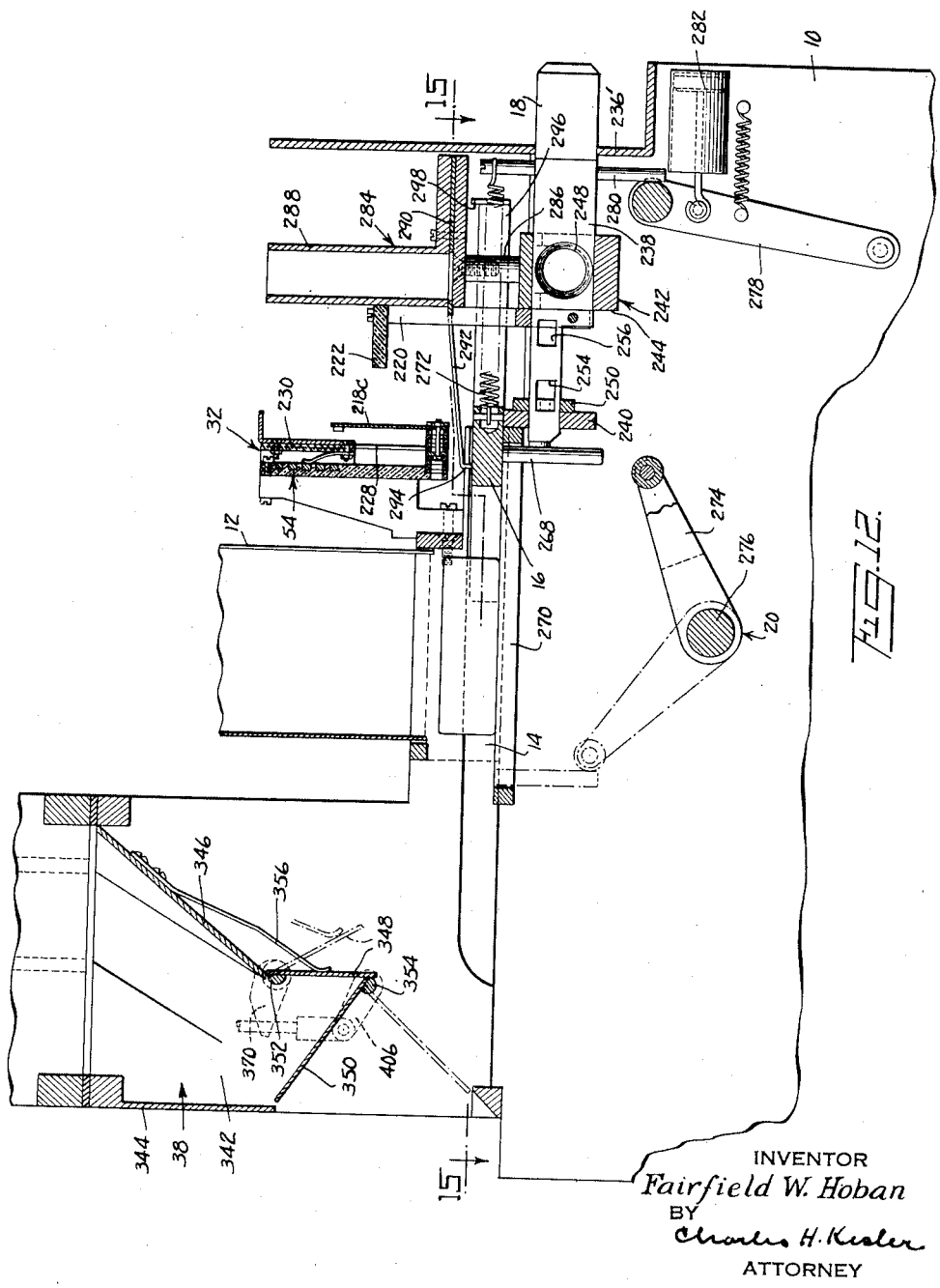

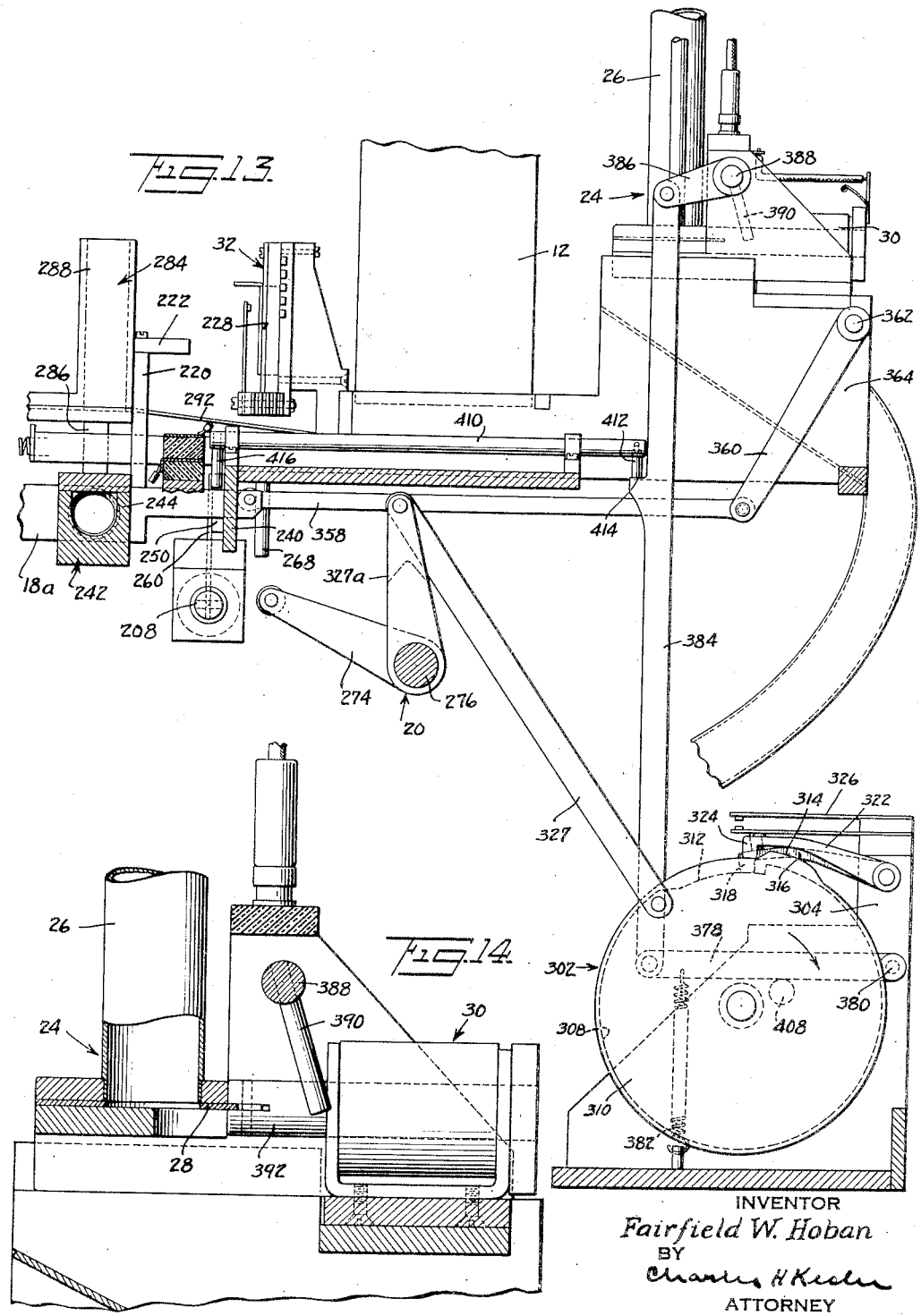

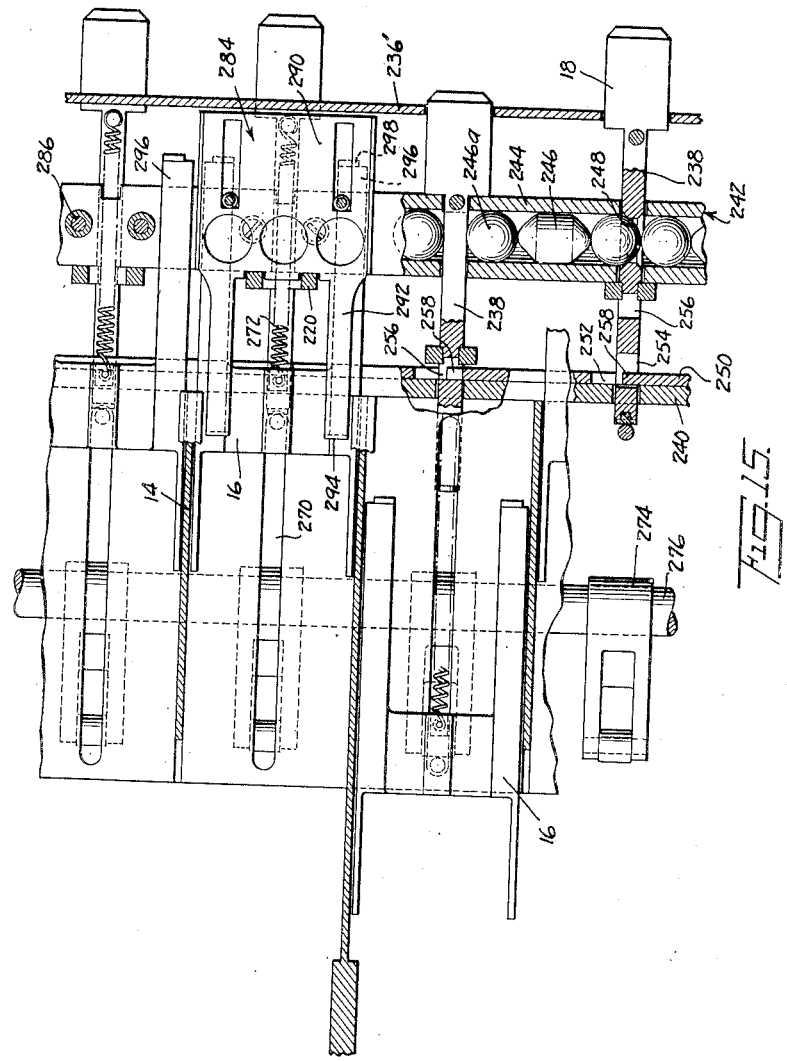

INVENTOR
Fairfield W. Hoban
BY
Charles H. Kesler
ATTORNEY

April 13, 1937.　　　F. W. HOBAN　　　2,076,564
CHECK OPERATED VENDING APPARATUS
Filed Aug. 15, 1933　　　12 Sheets-Sheet 12
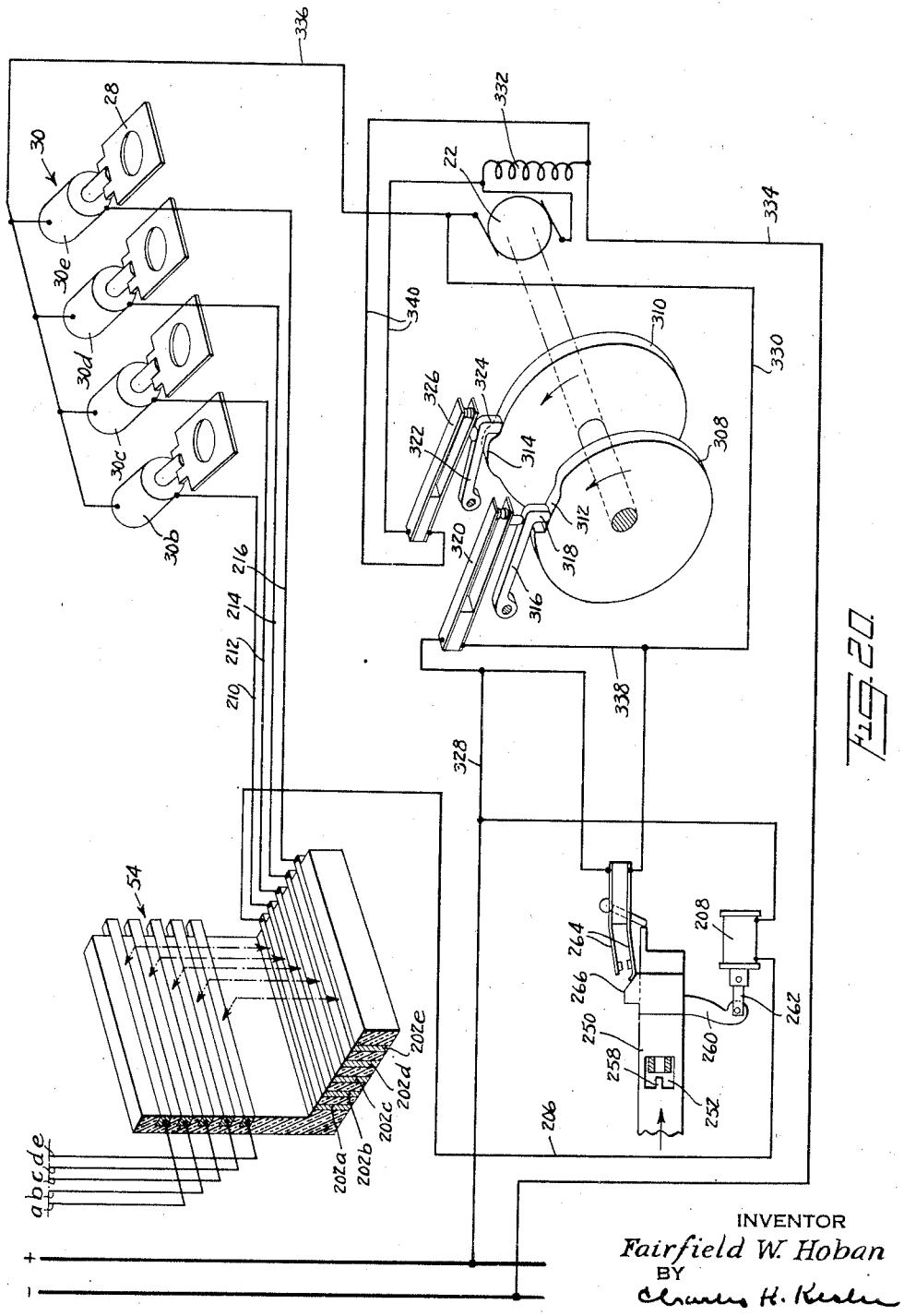
INVENTOR
*Fairfield W. Hoban*
BY
ATTORNEY Patented Apr. 13, 1937

2,076,564

UNITED STATES PATENT OFFICE 2,076,564

CHECK OPERATED VENDING APPARATUS

Fairfield W. Hoban, New York, N. Y., assignor to J. E. Stewart, New York, N. Y., doing business under the firm name and style of Stewart & McGuire Application August 15, 1933, Serial No. 685,175

66 Claims. (Cl. 194—18)

My invention relates to check or coin controlled apparatus for vending commodities of various kinds, such as cigarettes, cigars, candy, chewing gum and other articles in packages or otherwise, and the same has for its object to provide a simple, reliable and efficient apparatus which may be operated to effect the ejection of an article without complicated manipulation requiring more than ordinary intelligence, and which is substantially immune to fraudulent or accidental manipulation or operation to prevent dispensing of the article without the required value in coins being inserted.

It is also an object of my invention to provide an apparatus of the character specified which is operated electrically in part under control of the coins inserted and in part under control of manipulation to vend selectively a plurality of different articles of the same value or different values and to return in change any balance of credit representing the difference between the amount of money inserted and the price of the article selected.

Another object of the invention is to provide an apparatus of the character specified in which the check operated circuit controlling means thereof is responsive to the passage of one or more coins of the same or different denominations not exceeding in value a predetermined sum.

Another object of the invention is to provide for the return of coins totaling in excess of said predetermined amount.

Another object of the invention is to provide electrical means for rejecting slugs or spurious checks under the control of the check operated mechanism for effecting the return of excess coins.

Another object of the invention is to provide electrically operated means under the control of the check operated means and of the several selectively operated means for returning change.

Another object of the invention is to provide an electric motor for causing the ejection of the various articles from their compartments and for resetting the apparatus.

Another object of the invention is to provide an apparatus of the character specified in which the coin operated master mechanism is operated to set the motor and change making circuits for selective operation in response to the insertion of units of coin value each equal to the coin of lowest denomination receivable, one or more of said coin units according to the price adjustment of the selective operable controls for the circuits; setting the circuit for starting the motor, and any coin units received in excess of those required to set the motor starting circuit setting the circuits of one or more of the change returning means.

Another object of the invention is to provide an apparatus of the character specified in which each of the manually operated circuit controlling means thereof is adjustable to vend articles at various prices or units of coin value and to correspondingly determine the number of coin units to be returned as change.

Another object of the invention is to provide an apparatus of the character specified in which the motor and change means are controlled to insure simultaneous operation thereof.

Another object of the invention is to provide an apparatus of the character specified in which each selectively operated element, when actuated to start the motor to dispense one article is automatically locked to prevent selection of another article after the motor starts.

Another object of the invention is to provide an apparatus of the character specified in which the motor controls its own circuit to effect the resetting of the apparatus by motor power before the motor circuit can open.

Another object of the invention is to provide an apparatus of the character specified in which each of the several manually operated selector elements when actuated to control the circuits moves the corresponding article ejecting means into position to be actuated by a common motor driven actuating mechanism.

Another object of the invention is to provide an apparatus of the character specified in which provision is made for manually resetting the apparatus and returning any deposited coins to the operator prior to the operation of the motor.

Another object of the invention is to provide an apparatus of the character specified in which provision is made for the return of change in sub- units of a cent.

Other objects will in part be obvious and in part be pointed out hereinafter.

In the accompanying drawings:

Fig. 4 is a rear elevation thereof;

Fig. 5 is a vertical section thereof on the line 5—5 of Fig. 4;

Fig. 6 is a vertical section thereof on the line 6—6 of Fig. 4 showing the rotatable contact member advanced one step;

Fig. 7 is a horizontal section thereof on the line 7—7 of Fig. 5;

Fig. 8 is a perspective of the rotatable contact member shown at Figs. 5 to 7;

Fig. 9 is a sectional elevation on the line 9—9 of Fig. 4;

Fig. 10 is a vertical section on the line 10—10 of Fig. 4;

Fig. 11 is a diagram of a part of the circuits controlled by the check operated mechanism the latter being shown diagrammatically.

Fig. 12 is a vertical section of the apparatus on the line 12—12 of Fig. 1;

Fig. 13 is a vertical section thereof on the line 13—13 of Fig. 1;

Fig. 14 is a vertical section thereof on the line 14—14 of Fig. 2;

Fig. 15 is a sectional plan thereof on the line 15—15 of Fig. 12;

Fig. 20 is a circuit diagram of the remainder of the circuits with parts of the mechanism shown diagrammatically.

Figure 16:
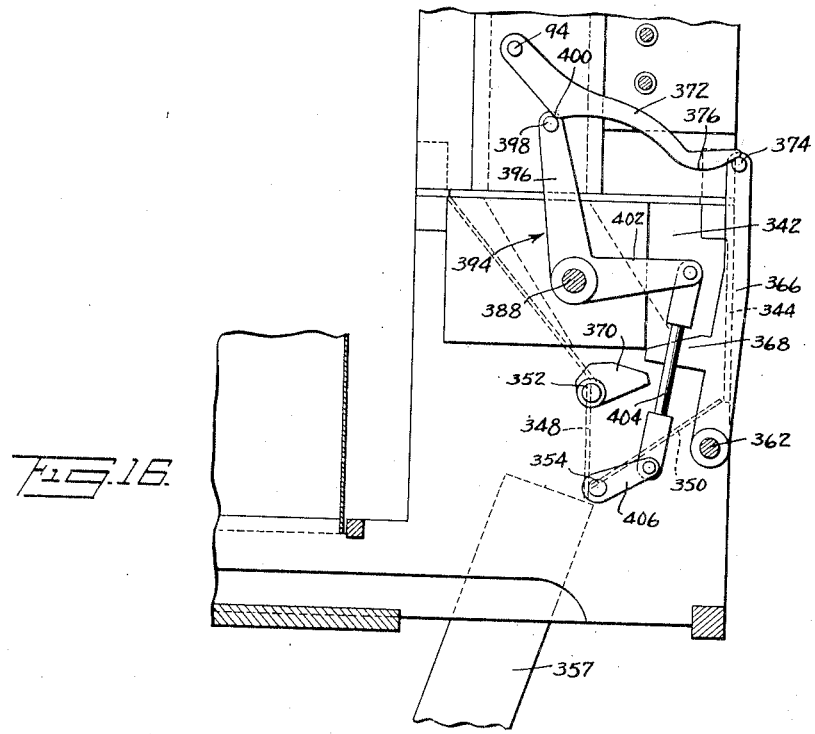
Fig. 16 is a vertical section thereof on the line 16—16 of Fig. 2.

Referring to the drawings, the apparatus embodying my invention comprises a suitable support or frame 10 on which are mounted a plurality of vertical compartments 12 (Figs. 12, 13 and 16) for receiving the various articles to be dispensed. Each compartment terminates at the lower end thereof in spaced relation to a guideway 14 for slidably receiving an article ejecting member 16 individual to each compartment, the members or slides 16 being independently and selectively moved by the selector push buttons 18 into positions to be actuated to eject the article by common slide actuating means 20 operated by the electric motor 22 which also resets the apparatus as hereinafter more fully described.

I also provide a common change returning means 24 (Figs. 1, 2, 13 and 14) mounted in a suitable location on the support 10 and preferably comprising a plurality of vertical tubes 26 having coin ejecting slides 28 operated by electromagnets as indicated generally at 30.

The circuits of the motor 22 and electromagnets 30 are in part under the control of the push buttons 18 each of which when actuated closes a group of contacts constituting selectively operated circuit controlling means 32.

The circuits including the several selective circuit controlling means 32 are also under the control of a master totalizing circuit controlling mechanism 34 (Figs. 3 to 11) operated by the coins or checks inserted, all as hereinafter more fully described.

*The coin operated circuit controlling mechanism*

The coin operated mechanism 34 is mounted as a self contained unit in a frame or support 36 disposed above the coin receiving receptacle 38 (Figs. 1, 2, 12 and 16). The mechanism in the embodiment of the invention illustrated is provided with three coin chutes 40, 42 and 44 adapted for the passage of a nickel, a dime, and a quarter respectively, the chutes discharging the coins into receptacle 38. The coins in their passage close the circuits of a plurality of electromagnets 46—48—50, the magnets 46 and 48 actuating a totalizing circuit controlling means 52 for the nickel and dime, and the magnet 50 actuating a circuit controlling means 52a for the quarter. Both means 52 and 52a constituting the master control 34 are operated to place in circuit with one side of the line a group of five fixed contacts 54 (designated individually in Fig. 20 as a—b—c—d—e). Said contacts 54 are common to the several sets of selectively operated contacts 32. The operation of the means 52 and 52a is such that the circuits between contacts 54 and one side of the line close successively as each five cent unit of coin value is inserted in the apparatus.

The electromagnets 46—48—50 are preferably of the type disclosed and claimed in my copending application Serial No. 640,495, filed October 31, 1932 in which the magnetic coils thereof are closed by means of the sets of coacting contacts 56—58—60 at the upper ends of the magnets in circuit with the line.

Each set of contacts 56—58—60 comprises a fixed contact mounted on a bracket 62 and a movable contact mounted on a spring member 64 below the bracket 62. Each spring member 64 carries a magnetic armature 70. The several spring members 64 are held in open circuit positions by means of the spring controlled detents 72 having arms 74 extending into the chutes 40, 42 and 44 to be actuated by the passing coins. When a coin strikes any arm 74 the circuit of the corresponding magnet closes to magnetically actuate the plunger armatures 76, 78 or 80. As these plungers reach their uppermost positions the increased magnetic effect attracts the armatures 70 to automatically open the circuits of the magnets and allow the return of the plungers 76—78—80.

The plunger 76 actuated by the nickel is pivotally connected to a member 82 (Figs. 5, 6 and 7) pivotally mounted on a transverse shaft 84 rotatably journaled in the frame 36. The member 82 carries a spring pressed pallet 86 coacting with a metallic toothed portion 88 on a rotary contact member 90 of insulating material secured to the shaft 84 and constituting a part of the master mechanism 34. A ratchet 92 also coacts with the teeth 88, said ratchet being disposed back of the pallet 86 and secured to a shaft 94 extending transversely across and journaled in the frame 36. A spring 96 secured to arm 97 on the shaft 94 holds the ratchet 92 in engagement with the teeth 88.

The teeth 88 on the member 90 in the particular embodiment of the invention illustrated comprise seven in number to allow the plunger 76 to impart for each nickel inserted a step-by-step movement to the member 90 for successively closing the circuits from one side of the line to the contacts a—b—c—d—e. The member 90 (Fig. 8) is provided with a peripheral contact 98 including two offset circumferentially extending portions 100 and 102 connected by a transverse portion 104. The contact portion 100 coacts with a series of six separate contacts 106 and 106a to 106e supported on an arcuate insulating member 108 and disposed so that the contact 106 is normally in engagement with portion 100, and to cause the contacts 106a to 106e to successively engage with portion 100 as the member 90 is rotated step-by-step, thereby successively closing the circuits from the contacts a—b—c—d—e.

The contact portion 102 coacts with a series of contacts 110, 112 and 114 on member 108. These contacts 110—114 all engage the portion 102 in the unactuated position of member 90 and are arranged in circuit with electrically operated slug elimination devices 116, 116a and 116b (Fig. 11) for the quarter, dime and nickel respectively. The contacts 110—112—114 are arranged to disengage contact portion 102 upon actuation of rotor 90 to short circuit the slug eliminators 116—116a and 116b in such order that when any coin inserted totals an amount in excess of twenty-five cents, the excess coin is returned to prevent actuation of the master mechanism thereby as hereinafter more fully described.

The plunger 78 controlled by the dime imparts a step-by-step movement to the toothed member 118 (Fig. 9) secured to the shaft 84. The plunger 78 is pivotally connected to an arm 120 swinging on shaft 84 and carrying a spring pressed pallet 122 coacting with the series of teeth on the member 118. A finger 124 is secured to the shaft 94 back of the pallet 122 for disengaging the same. The plunger 78 upon each actuation moves substantially twice the distance that the plunger 76 moves so that for each dime inserted the member 90 moves two steps or increments of movement to control the circuits. In their lowermost positions the plungers 76 and 78 rest on the stops 126 and 128. Upon the release of the ratchet 92 and pallets 86 and 122 by actuation of the shaft 94 as hereinafter described, the shaft 84 and parts carried thereby are returned to normal position or reset by the spring 130.

The plunger 80 controlled by the quarter, actuates the circuit controlling means 52a which is mechanically actuated independently of the mechanical circuit controlling means 52 for the nickel and dime so that the circuits from one side of the line to the contacts a—b—c—d—e may be closed by a single movement of the plunger 80 without imposing too long a throw on the plunger such as would be required if the plunger had to move member 90 through five steps or increments of movement at one operation. The circuit controlling means 52a for the quarter includes a contact member 134 of insulating material rotatably mounted on the frame 36 (Fig. 10) and coacting with an arcuate insulating member 136. The plunger 80 is pivotally connected to an arm 138 swinging on the shaft for the member 134 and carrying a spring pressed pallet 140 engageable with a toothed portion 142 on member 134. A ratchet 144 secured to shaft 94 also engages the teeth 142 back of the pallet 140. The plunger 80 in its lowermost position rests on a stop 146. The plunger 80 upon actuation moves the member 134 one step (the equivalent of the five steps of member 90) against the tension of the return spring 148.

The rotary member 134 has a series of fixed radial contacts 150 and 150a to 150e conductively connected by an annular portion 152, the contact 150 having an enlarged circumferential portion 154 to provide a dwell for a contact 156 on member 136 to maintain the conductive portion of member 134 always in circuit with one side of the line as shown in Fig. 11. The member 136 also carries a contact 158 which normally engages contact 150a to complete the circuit through contact 106 from the same side of the line to the circuits controlled by the member 90 including the slug eliminators 116, 116a and 116b. The contact 158 is disengaged to open the circuits controlled by member 90 upon actuation of member 134. The member 136 also carries a series of contacts 158a to 158e normally in offset relation to the contacts 150a to 150e but adapted to engage the same to close contacts a—b—c—d—e with the same side of the line upon actuation of member 134, the contacts 158a to 158e being in circuit with the corresponding contacts 106a to 106e through the conductors 160a to 160e (Fig. 4) and the contact 158 being electrically connected with the contact 106 through conductor 162.

The slug eliminators 116—116a—116b are shown diagrammatically for the purpose of the present invention in Fig. 11 and are preferably of the type shown and described in my copending application Serial No. 517,222, filed Feb. 20, 1931, for preventing the acceptance of checks counterfeiting silver coins, and in my copending application Serial No. 665,066, filed April 8, 1933, for preventing the acceptance of checks counterfeiting nickel coins.

The slug eliminators each comprises a magnetic core 164 providing a gap or gaps associated with the chutes 40—42—44 and traversed by fluctuating or alternating magnetic fields. Coils 166 are disposed about the cores 164. The circuits of each of the coils 166 is controlled by the action of a coin or check actuated, timing electromagnetic device 168, preferably of the character shown and described in my copending application Serial No. 640,495 above mentioned. The circuit of each coil 166 is controlled by a pair of contacts 170 tending to close and normally held in open position by the weight of the armature plunger 172 of the timing device 168. The plunger 172 is magnetically elevated to allow the contacts 170 to close upon the closing of the circuit of the coil 174 of the timing device 168. The circuit of the coil 174 is controlled through the contacts 176 tending to close and normally held in open position by the detent 178 having an arm 180 extending into the path of the coin in the chute. When the plunger 172 reaches its uppermost position the increase in magnetic effect causes the armature 182 to be attracted to automatically open the circuit of coil 174, the plunger thereupon returning with a delayed action to open the contacts 170 of the coil 166. In operation, good coins passing through the slug eliminators are deflected from a normal gravitational path into the portions of the chutes 40—42—44 leading to the master mechanism 34 to actuate the same while slugs and counterfeits pass out through a normal gravity path into chutes 184 to be returned. When the eliminators 116, 116a and 116b are dead, i. e., unenergized any good coin will also pass out through the normal gravity path through chutes 184 to be returned.

The input side of the coils 166 and 174 of each of the several eliminators 116, 116a and 116b are connected with one side of the line (indicated for convenience as plus) through the conductors 186. The circuits of the coils 166 at the negative side of the line, and preferably the output circuits for both coils 166 and 174 of each eliminator are also controlled by the operation of the master mechanism 34 to prevent passage of good coins to said mechanism in excess of a predetermined amount, say twenty-five cents. For this purpose a conductor 188 extends from the common output point 190 of the coils 166 and 174 of the quarter slug eliminator 116 to the contact 110, a conductor 192 extends from the common output point 194 of the dime eliminator 116a to the contact 112, and a conductor 195 extends from the common output point 196 of the nickel eliminator 116b to the contact 114. The circuit is completed to the negative side of the line through the conductive portion of rotary member 90, contact 106, conductor 162, contact 158, the conductive portion of rotary member 134, and contact 156. The contacts 106a to 106e and contacts 158a to 158e connected by conductors 160a to 160e are in circuit with the negative side of the fixed selective contacts a—b—c—d—e through the conductors 200a to 200e. The remainder of the circuits is illustrated in Fig. 20 and is hereinafter more fully described.

In operation, when a nickel is inserted in chute 40 member 90 is rotated one step to disengage contact 110 from contact portion 102 and to bring contact portion 100 into engagement with contact 106a. This operation opens the circuit of the slug eliminator 116 to prevent operation of the master mechanism 34 by a quarter if the same is now inserted. The eliminator 116, now being dead, returns any quarter inserted. This operation also closes the circuit between the contact "a" and the negative side of the line. As additional nickels are inserted, the contacts 106b to 106e are successively engaged by the portion 100 to successively close the circuits between the contacts "b" to "e" and the negative side of the line. When a fourth nickel is inserted, the contact 112 is positioned to disengage the contact portion 102 to open the circuit of the slug eliminator 116a to prevent operation of the mechanism 34 by a dime as above described. Upon insertion of the fifth nickel the portion 102 disengages the contact 114 to open the circuit of the eliminator 116b to prevent operation of the mechanism by another nickel.

The operation of the master mechanism 34 upon insertion of dimes into the chute 42 is substantially like that for the nickel, except that the rotary member 90 is moved two steps for each dime inserted. The insertion of the first dime opens the circuit of the quarter eliminator 116 and the insertion of the second dime opens the circuit of the dime eliminator 116a. The master means 34 is actuated upon insertion of any combination of nickels and dimes not exceeding twenty-five cents to successively close the circuits between contacts a—b—c—d—e and the negative side of the line.

Upon insertion of a quarter into chute 44, member 134 is rotated to cause contact 158 to disengage the contact 150a. This operation opens the circuits of all of the slug eliminators by opening the circuit portion 162 between the contact 106, and contacts 110—114, and the negative side of the line. The same operation causes engagement of the contacts 158a to 158e with contacts 150a to 150e to place contacts a—b—c—d—e in circuit with the negative side of the line.

*The price adjusted selectively operable circuit controls*

The several selectively operable circuit controlling means 32 closed by the push buttons 18 (Figs. 1, 12, 14, 17, 18, and 19) include the five fixed contacts a—b—c—d—e which consist of transverse metallic strips arranged in spaced relation one above the other and embedded in the upper portion of a vertical panel 202 of insulating material located on the forward portion of frame 10 above the slides 16, said strips 54 being common to the several circuit controlling means 32. Said means 32 also include separate coextensive transverse metallic strips (five in number) disposed horizontally in spaced apart relation between the insulating portions 204 forming a ledge at the lower portion of the panel 202, said last named strips being indicated at 202a to 202e.

As shown at Fig. 20, the strip 202a is electrically connected by conductor 206 with the negative pole of a relay electromagnet 208 for controlling the joint operation of the motor 22 and of the change magnets 30 while the strips 202b to 202e are electrically connected by conductors 210 to 216 to the negative poles of the change magnets 30, indicated individually as 30b to 30e, all as hereinafter more fully described.

The manual closing of the circuits between the conducting strips "a" to "e" and 202a to 202e by means of the selective push buttons 18 is effected through the groups of five spring finger contacts 218a to 218e extending vertically from the forward edge of the ledge portion 204, each group lying in the path of a vertical actuating member or upright 220 secured at the lower end thereof to the corresponding push button 18 and having a contact engaging portion 222 of insulating material at the upper end thereof.

Figures 17, 19:
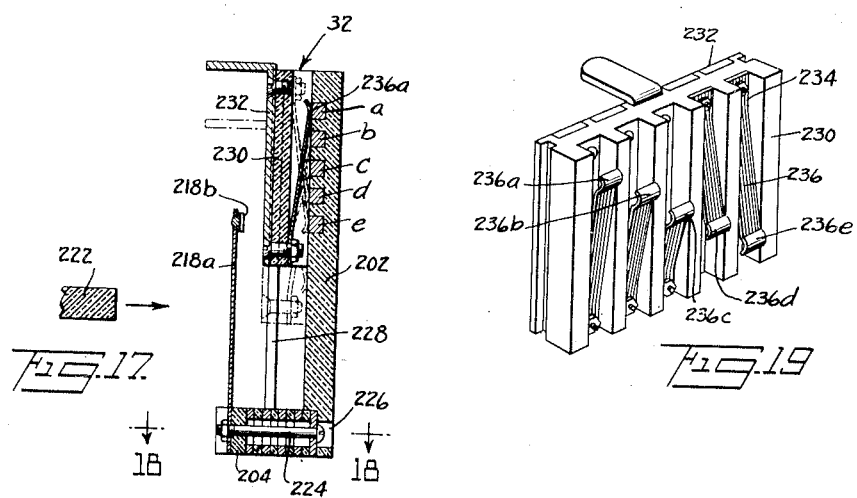
Fig. 17 is an enlarged detail vertical section of the selective contact control on the line 17—17 of Fig. 1.
Fig. 19 is a perspective of one of the adjustable or price setting selector contact elements.
Figure 18:
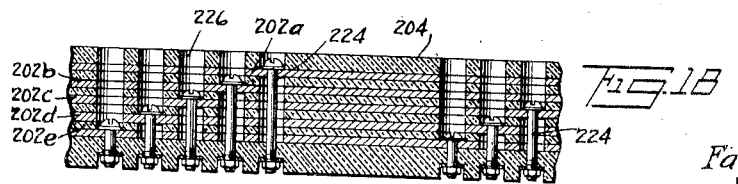
Fig. 18 is a sectional plan thereof on the line 18—18 of Fig. 17.

As shown more clearly at Figs. 17 and 18, the spring contact 218a is electrically connected with the metallic strip 202a and in like manner the spring contacts 218b to 218e are electrically connected with a different one of the metallic strips 202b to 202e respectively by bolts, indicated generally at 224, extending through the clearance spaces 226 so that the bolt connected to one metallic strip is insulated from the other metallic strips.

In the present invention I make provision associated with each of the selective circuit controls 32 for determining the price at which an article from each compartment 12 is to be vended. For this purpose, I provide sets of spaced vertical guideways 228 upon the front of the panel 202 slidably receiving blocks 230 of insulating material. Each block 230 at the front thereof is provided with vertically extending spaced metallic strips 232 corresponding in number with the spring contacts 218a to 218e and each disposed to be engaged by a different one of said spring contacts. Each block 230 at the rear thereof is provided with vertical grooves 234 receiving spring contacts, indicated generally as 236, having free ends 236a to 236b adapted to frictionally engage the fixed contact strips a—b—c—d—e and each electrically connected to a different one of the front strips 232. The contact ends from contact 236a to contact 236e progressively decrease in elevation, the spring contacts 218a to 218e when depressed being placed in circuit with the contacts 236a to 236e in the same order, i. e. the contact 218a with contact 236a, etc.

It will be noted that when the block 230 is in its uppermost position the contact 236a engages the upper contact strip "a" and the contact 236e engages the lowermost strip "e", the parts being now in position to vend an article from the corresponding compartment for five cents, returning if a quarter is inserted, twenty cents in nickels as change. If the block 230 is adjusted so that contact 236a engages contact strip "b", at least ten cents in coins must be inserted before the master mechanism 34 closes the circuit from "b" to one side of the line, and hence, before depression of the contacts 218a to 218e can complete the circuits to start the motor and operate the magnets 30. In the second position of the block 230 the lowermost contact 236e disengages strip "e" so that upon actuation of the selective contacts 218a to 218e the change magnet 30e remains open circuited, the remaining change magnets 30b—30c and 30d returning one to three nickels upon the selective operation, depending on the amount of coins inserted. By adjustment of each block 230 as above described, the circuits controlled by each button 18 may be set to require one to five units of five cent coin value to be inserted into the apparatus before the motor upon depression of a push button 18 can be operated to eject the article. This adjustment also cuts out one of the change magnets 30b to 30e for each five cent increase in price determining adjustment so that the change returned always represents in nickels the difference between the amount of coin inserted in the apparatus and the price of the article selected.

*The mechanical features of the selective control*

The push buttons 18 selectively controlling the circuits at 32 as above described are also utilized for placing the ejector elements or slides 16 each selectively in operative relation to the common actuating means 20. As shown at Figs. 1, 12, 14 and 15, the buttons 18 are slidably disposed in a plane slightly below the plane of the slides 18 and in advance thereof. Each button 18 projects at the front thereof through the panel 236' and is provided with a reduced or flattened stem portion 238 slidably supported at the inner end by the transverse member 240 of the frame or support 10. I also provide means, indicated at 242, associated with the several push buttons between the parts 236a and 240 for preventing more than one push button from being operated at a time. This means comprises an elongated transversely arranged inclosure or race 244, containing a plurality of loosely arranged elements 246 and 246a, the elements 246a consisting of balls disposed at opposite sides of the reduced portions 238 of the buttons, which portions 238 extend through openings in the race 242, and are provided with holes 248 adapted to register with the balls 246a in the projected position of the push button. The clearance between the elements 246—246a is such as to allow one only of the push buttons 18 to be depressed at a time to force the reduced portions 238 therebetween, the movement of one push button forcing the balls 246a into the holes 248 of the other push buttons to lock the same.

I also provide common means for locking each push button 18 in depressed position when the motor 22 starts to prevent return of the depressed push button and the actuation of another button after the article ejecting operation starts. This means consists of an elongated slide 250 extending transversely of the push buttons 18 and slidably supported at the front of the member 240. The slide 250 is provided with a series of holes 252 through which the button portions 238 extend, and each of the latter are provided with spaced holes 254 and 256, the holes 254 and 256 being adapted to receive the tongues 258 formed on the slide 250 and projecting into the holes 252 thereof. The slide 250 at one end is provided with a depending arm 260 connected to the armature plunger 262 of the electromagnet 208 to be actuated thereby when the circuit therethrough is closed as above described. The construction is such that when one of the push buttons 18 is depressed as shown in Fig. 15 to complete the circuit through the magnet 208 (see Fig. 20) the slide 250 is moved to the right (Fig. 1) to cause one of the tongues 258 to enter the hole 256 of the depressed button 18 to lock the same, the remaining tongues 258 on the slide 250 entering the holes 254 of the undepressed buttons 18. The movement of the slide 250 to locking position automatically closes an independent circuit through the motor 22 and to one side of the several change magnets 30b to 30e, as hereinafter described, by the closing of the contacts 264 by the cam portion 266 on the slide 250. Hence, when the motor starts to effect the ejecting operation, it will be impossible to release the depressed button 18 and actuate other buttons to move the ejecting slides of other compartments into operative relation to the moving slide actuating means 20 to obtain articles of greater value than the amount of money inserted in the apparatus. The locking operation also insures that the particular selective circuit controlling means 32 actuated by the depressed button remains closed until release of the locking slide 250 as hereinafter described.

The individual ejector elements 16 sliding in the guideways 14 are provided with depending pins 268 riding in slots 270 in the bases of the guideways, each pin 268 being engaged by the inner end of one of the push buttons 18. The slides 16 are mounted for movement independent of the buttons 18 but are held in retracted positions in contact with the buttons 18 by coil springs 272 each secured at one end to a push button 18 and at its opposite end to the corresponding slide 16. When any push button 18 is depressed the pin 268 of the corresponding slide is moved into the path of one of the arms 274 on the motor actuated shaft 276 constituting the common slide actuating means 20.

The return of the buttons 18 to projected or normal positions is effected by a member 278 swinging on the frame work 10 and engaging depending pins 280 on the buttons 18, said member 278 having spring means 282 of the dashpot type acting thereon to return any depressed push button, the dashpot retarding such return to obviate noise and jar.

*The auxiliary change returning means*

In order to render the apparatus readily adaptable to vend articles at prices other than in units of five cents, for example, to allow articles to be vended at eleven or twelve cents, or at two or three cents, I provide auxiliary change returning means 284 adapted to be readily associated as a unit with one or more of the cooperating sets of slides 16 and push button 18 to be actuated thereby to return change in sub-units of a cent. For example, I have illustrated at Figs. 1, 12, 13, and 15, one of such units 284 secured to the upstanding posts 286 on the race member 244 above one of the slides 16. The unit 284 includes one to four change tubes 288, three tubes for receiving one cent coins being illustrated, having coin ejecting slide 290 at the bases of the tubes for ejecting the coins upon actuation thereof. The slide 290 at opposite sides is provided with rearwardly and downwardly extending fingers 292 having downturned lugs 294 at the ends thereof engaging the article ejecting slide 16. The slide 16 has side portions 296 extending towards the front at opposite sides of the upright 220 and spring 272 and terminating in upturned lugs 298.

In the inactive position of the slide 16 shown, the distance between the lugs 294 and 298 is greater than the distance that the associate slide 16 can be moved by its push button 18. In operation, however, as the slide actuating means 20 takes over the movement of the associated slide 16 the lugs 298 ultimately engage the lugs 294 to effect coin ejecting movement of the slide 290. Upon return of the associated depressed button 18, the upright 220 thereof engages the slide 290 to return the same to the original position as shown. The ejection of the coins from tubes 288 can only be effected by operation of the motor.

Utilizing three tubes 288 as shown, one, two or three cents can be returned as change depending on whether or not the tubes contain coins. By adjustment of the article value changing contact block 230 associated with the auxiliary change device 264, the prices at which the various articles are vended from the associated compartment may be varied over a wide range. Although the particular compartment 12 shown at Fig. 12 is adjusted at contacts 32 to vend an article therefrom for two cents; provided that all three tubes 288 are filled with coins, block 230 may be readily adjusted to vend the same or different articles at seven, twelve, seventeen or twenty two cents, or at other prices depending on the number of tubes 288 in operation.

*The motor and change making circuits*

Upon depression of any of the push buttons 18, the particular contacts 218b to 218e associated therewith are depressed to engage conducting strips 232 and close the circuits to the negative side of one or more of the change magnets 30b to 30e, depending on the price adjustment at 32 and on the amount of money inserted in the apparatus, and the contact 218a then engages its conductive strip 232 to close the circuit of the magnet 208, causing actuation of the locking slide 250 and the closing of the contacts 264 in circuit with the positive side of the magnets 30b to 30e and in circuit with the motor 22. The contact point of each spring contact 218a (Fig. 17) is shorter than the contact points of the spring contacts 218b to 218e so that the latter engage the strips 232 before the former to insure closing of the circuits to the negative side of the magnets 30b to 30e before the contacts 264 close to start the operation of the change magnets 30 and of the motor 22.

Figure 1:
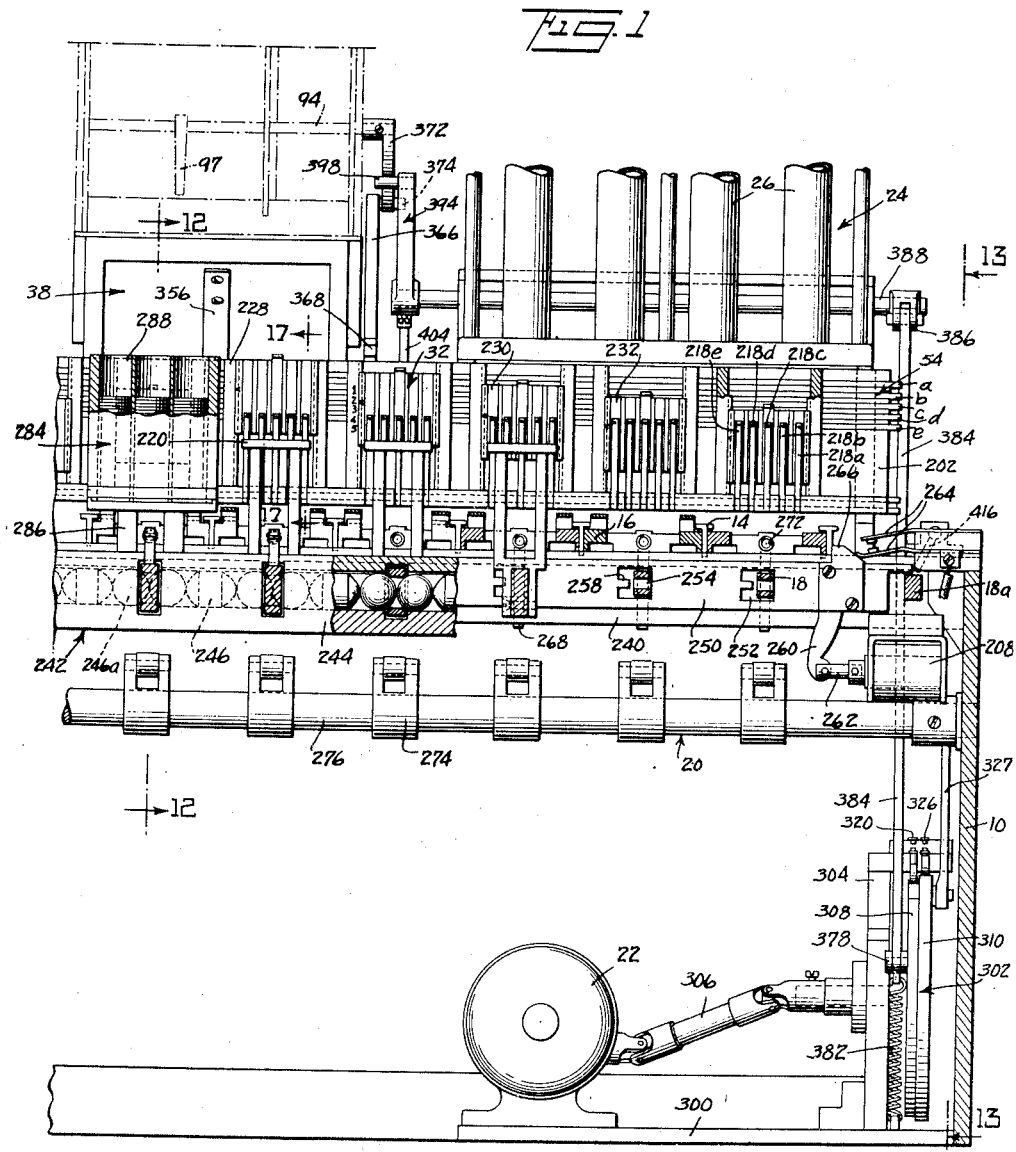
Figure 1 is a front elevation of one form of apparatus constructed according to and embodying my said invention, parts being broken away or omitted and parts being in section.
Figure 2:
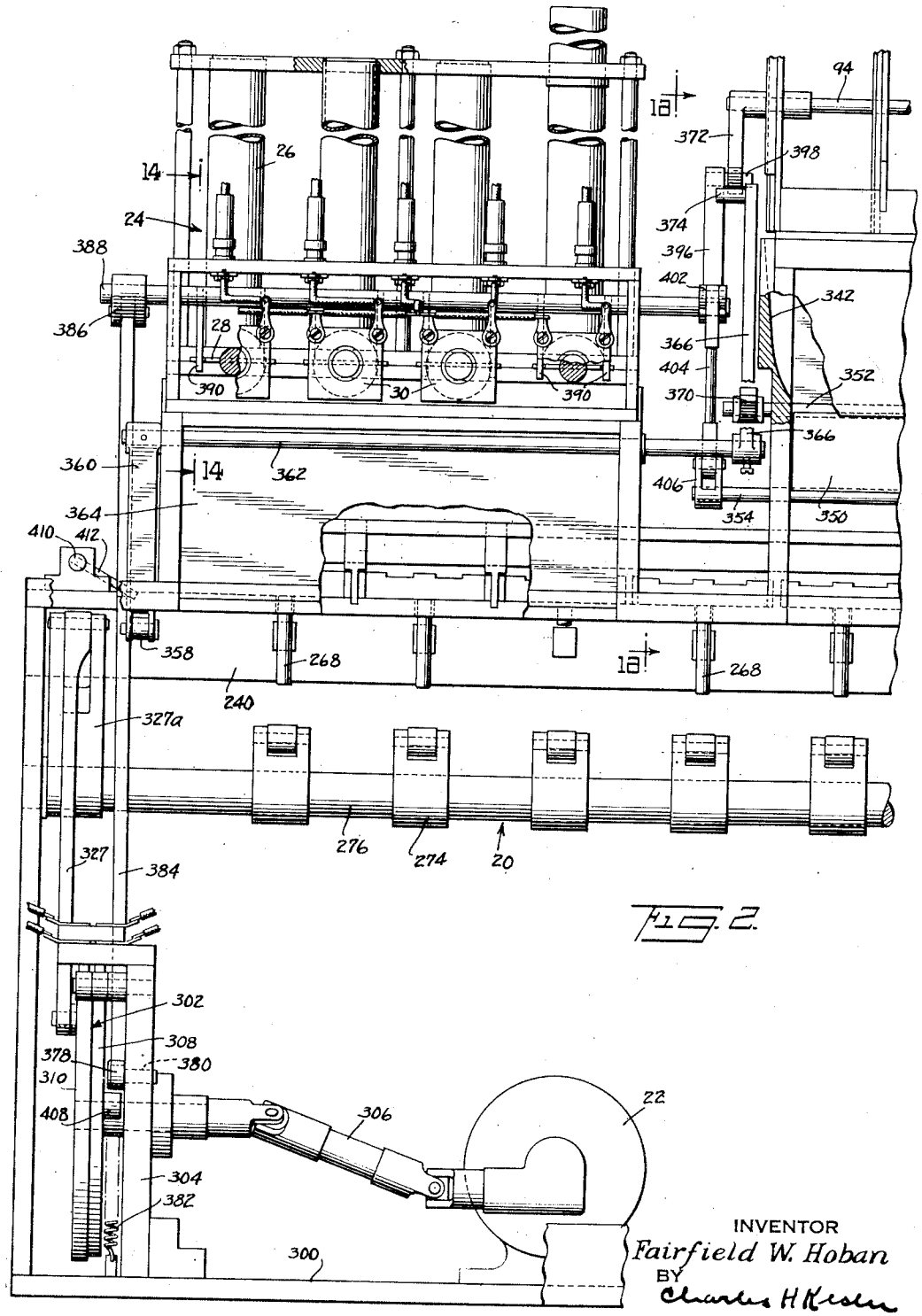
Fig. 2 is a rear elevation thereof, parts being broken away and parts omitted.
Figure 3:
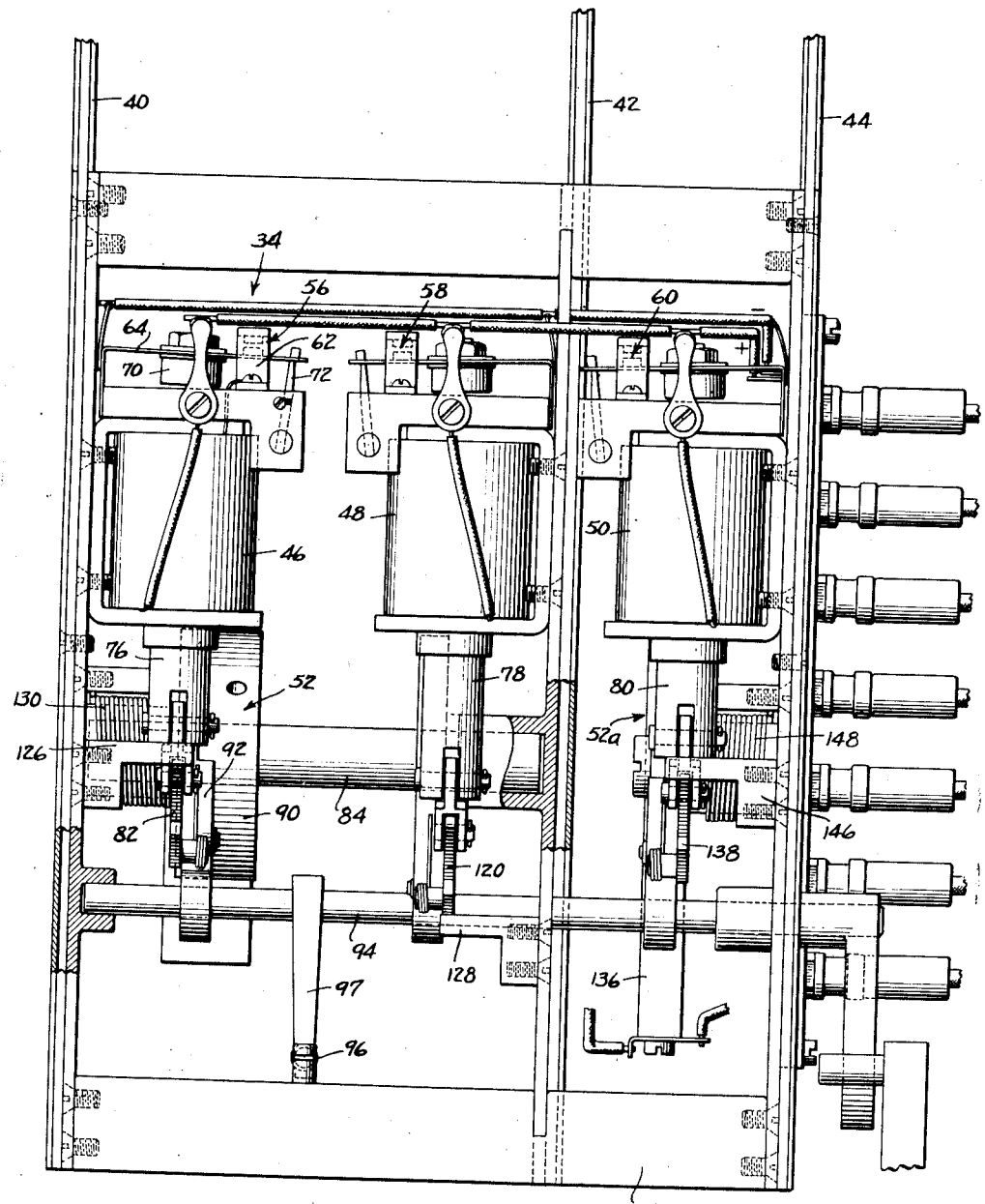
Fig. 3 is a front elevation of the coin operated master circuit setting or controlling means.

Referring to Figs. 1, 2, and 13, the motor 22 is supported upon a platform 300 at the bottom of the frame 10. A rotatable disk member 302 is journaled on an upright support 304 on platform 300 for rotation from the motor 22 through a flexible shaft 306. The disk member 302 includes reduced and enlarged peripheral cam portions 308 and 310, the former having a recess or depression 312 therein and the latter having an enlargement or hump 314 thereon, the remaining part of each periphery 308 and 310 being otherwise of uniform radius.

The reduced portion 308 coacts with a member 316 pivoted to the support 304 and having a nose 318 riding on and guided by the periphery 308. A pair of normally open spring contacts 320 are secured to the support 304 above the arm 316 in position to be closed by said arm when the nose 318 thereof engages the part of the periphery 308 of greater radius, i. e., when the nose leaves the recess 312.

The cam portion 310 also coacts with a pivoted arm 322 having a nose 324 riding on said periphery 310. A pair of normally open spring contacts 326 are secured to the support 304 in position to be closed by said arm 322 when the nose 324 thereof engages the hump 314.

Oscillatory movement is imparted to the ejector slide actuating means 20 by means of a link 327 pivoted at one end to the outside of member 302 near the periphery and pivotally connected at its opposite end to the crank arm 327a secured to the actuating shaft 276, the operation being described hereinafter.

Referring now to Fig. 20, when the contacts 264 are closed, a circuit is completed through the motor 22 from the plus side of the line through conductor 328, contacts 264, conductor 330, the motor 22 including the series stator winding 332, and conductor 334 to the negative side of the line. At the same time the circuit is completed from contacts 264 to the positive side of the magnets 30, through a branch conductor 336 connected to the conductor 330. The motor thereupon starts operating to eject the article, and simultaneously the change magnets 30 actuate the slides 28 to eject the change.

When the member 302 starts rotating the arm 316 leaves the recess 312 and is elevated to close contacts 326. This closes an independent circuit through the motor from the positive side of the line through conductor 328, contacts 320, conductor 338, conductor 330, the motor 22 and conductor 334 to the other side of the line.

The contacts 320 remain closed until the rotation of member 302 is completed and the arm 316 again drops into the recess 312. The parts are so coordinated that the article ejecting operation and the resetting operation, including the opening of the circuit at contacts 264, as hereinafter described, are completed before the circuit of the motor through contacts 320 opens. The hump 324 is located to elevate the arm 322 to close the contacts 326 slightly before the contacts 320 open, and to maintain the contacts 326 closed for an interval after the contacts 320 open. The relative positions of the recess 312 and the hump 314 are clearly shown in Fig. 13. The closing of the contacts 326 short circuits the stator winding 332 through conductor 340 to retard the speed of the motor so that the motor always stops in the same position upon opening of the circuit thereof at 320.

*The coin depository controlling means and resetting mechanism*

The depository or receptacle 38 (Figs. 1, 2, 12 and 16) receiving the coins operating the master mechanism 34 comprises fixed end wall portions 342, a fixed vertical rear wall portion 344 and a fixed rearwardly inclined front wall portion 346. The bottom of the receptacle 38 comprises two trap doors 348 and 350 in the closed positions thereof disposed in converging relation extending downwardly from the lower edges of the wall portions 344 and 346. The door 348 is secured to a pivot rod 352 journaled in the opposite wall portions 342 adjacent to the lower edge of the wall 346, and the door 350 is secured to pivot rod 354 journaled in the side walls 342 vertically below the pivot 352 in such position as to serve as a stop for the door 348 in the closed position, said door 348 being urged to closed position by the leaf spring 356. The door 350 is normally retained by the actuating mechanism thereof as hereinafter described in closed position extending upwardly and rearwardly into proximity to the lower edge of the rear wall 344.

The door 348 may be manually opened by the operator at any time before the motor starts, the door swinging open to the position shown in broken lines Fig. 12 to dump out the inserted coins into a forwardly extending chute 357 to be returned.

The actuation of the door 348 is preferably effected by means of a special push button 18a, shown at the right hand end of Fig. 1 and also at Fig. 13. The push button 18a is constructed like the push buttons 18, and cooperates with the locking means 242 to prevent more than one push button 18 or 18a being depressed at a time. The push button 18a has a link connection 358 with a crank 360 secured to a transverse shaft 362 journaled in the framework forming the change discharge chute 364 and projecting into proximity to the wall 342 of the coin receptacle 38. An actuating arm 366 (Figs. 1, 2, and 16) is secured in vertical position to the projecting end of the shaft 362, and is provided with a forwardly directed finger 368 overlying a cam arm 370 secured to the projecting end of the pivot shaft 352, whereby upon depression of the button 18a the finger 368 engages arm 370 to open the gate or door 348 to return the coins to the operator.

The manual coin return mechanism is arranged to reset the master coin operated mechanism 34 so that the apparatus can not be operated to deliver goods after the coins are returned. For this purpose the contiguous projecting end of the resetting shaft 94 of mechanism 34 is provided with a cam arm 372 extending rearwardly into proximity to a pin 374 projecting from the upper end of the actuating arm 366 and coacting with the cam portion 376 on arm 372 so that when arm 366 is actuated the pin 374 rides on portion 376 to swing arm 372 upwardly, rotating shaft 94 against the tension of spring 96 and releasing the pallets and ratchets from the rotary members 90, 118 and 134 of the master mechanism 34 to allow the latter to return to normal position under the action of the resetting springs 130 and 148. Upon release of the push button 18a the spring urged button returning means 278 (Fig. 12), engaging also button 18a, returns the actuated parts to normal position, allowing the spring 96 to return shaft 94 to position causing reengagement of the ratchets and pallets with said members 90, 118 and 134 of the master mechanism 34 ready for another operation.

The apparatus, including said master mechanism 34, the change mechanism 30 (the ejector slides 28), locking slide 250, and the circuit of the motor through contacts 264 is also reset through operation of the motor, said operation also opening the gate or trap 350 of the coin receptacle 38 to dump any coin therein into a suitable receptacle within the cabinet of the apparatus to be retained. For this purpose an arm 378 is pivoted at 380 to the upright 304 and extends forwardly between said upright 304 and the motor driven member 302 over the shaft of said member 302. A coil spring 382 is secured at one end to the platform 300 and at its opposite end to said arm 378 to bias the arm towards said shaft. The arm 378 is connected by a link 384 to a crank arm 386 secured to a transverse shaft 388 journaled in the portion of the framework 10 supporting the change mechanism 24 on a line located above the slides 28 between the coin tubes 26 and magnets 30 (see Fig. 14). The shaft 388 at said slides 28 is provided with change slide resetting means, such as the depending fingers or pins 390 straddling the magnet armatures 392 and adapted to engage the slides 28 upon retraction thereof by magnets 30, and, upon actuation of shaft 388, to return said slides 28 to normal positions simultaneously with the opening of the negative side of the circuits of the magnets 30.

The shaft 388 projects at its opposite end beyond the change mechanism and carries a bell crank lever 394 at said end, said lever 394 including a vertical arm 396 having a pin 398 adapted to coact with a cam portion 400 on the arm 372 of reset shaft 94 for resetting the master mechanism 34 when said shaft 388 is rotated to swing said arm 396 rearwardly. The other arm 402 of the bell crank lever extends rearwardly and is connected by a link 404 to a crank arm 406 secured to the pivot shaft 354 of the door 350 to open the same as shown in broken lines Fig. 12.

The actuation of the shaft 388 from arm 378 against the tension of the spring 382 is effected by rotation of the member 302 through the eccentric pin 408 projecting from the inner side of the member 302 near the center below the arm 378. As the member 302 rotates in the direction of the arrow (Fig. 13) the pin 408 moves clockwise, and before the rotation is completed finally engages the arm 378 to lift the same temporarily to actuate the resetting mechanism as above described, the pin then allowing, as the motor circuit automatically opens at contacts 320, the actuated means to be returned by the action of spring 382, thereby closing the door 350 and releasing arm 372 to allow the ratchets and pallets to again engage the rotary members of the master coin operated mechanism 34.

The slide 250 is returned to unlocked position and the circuit through contacts 264 is opened at the same resetting operation by provision of a shaft 410 journaled on the frame 10 and extending from front to rear. A pin 412 is carried at the rear end of said shaft 410 and is biased by the weight of the parts to rest on a lug 414 on the link 384. As the link is elevated, an arm 416 on the forward end of the shaft 410 swings into engagement with the contiguous end of the locking slide 250, to return the same to normal position, unlocking the depressed push button 18, and opening the motor circuit through contacts 264, the motor circuit through contacts 320 remaining closed to insure continued operation of the motor until the resetting operation is completed.

The operation of the apparatus has been largely described in connection with the foregoing description of the various features of the invention. In general, the apparatus is set for selective operation by push buttons 18 upon the insertion of coins of various denominations, designated herein as a "nickel", "dime" and "quarter" up to predetermined limit, in the embodiment of the invention disclosed, not in excess of twenty-five cents.

The master mechanism 34 is actuated in response to the insertion of one to five five cents units of coin value, whether inserted in nickels, dimes, or combinations thereof, or as a quarter, the insertion of one coin unit short circuiting the quarter slug eliminator 116, the insertion of four coin units short circuiting the dime slug eliminator 116a, and the insertion of five coin units short circuiting the nickel slug eliminator 116b. This insures the return of any coin inserted in excess of twenty five cents to prevent actuation of the master mechanism 34 thereby.

The insertion of one to five coin units actuates the master mechanism to place a corresponding number of the contacts a—b—c—d—e, in circuit with the negative side of the line, the insertion of one coin unit closing the circuit to contact "a", the insertion of two coin units closing the circuits to contacts "a" and "b", and so on.

The contacts a—b—c—d—e at each of the selectively operable contact closing means 32 are operatively associated with the fixed contact 202a to the motor starting magnet 208 and with the fixed contacts 202b to 202e, each to one of the four nickel change ejecting magnets 30b to 30e.

The block 230 of each selectively operable contact means 32 is adjustable so that, upon action of the corresponding push button 18, any contact a—b—c—d or e may be placed in circuit through contact 202a with the motor starting magnet 208 to require the insertion of one, two, three, four or five coin units before the circuits can be closed to start the motor, thereby determining the units of credit required to effect the ejection of the article and hence the price at which the article is vended.

When the contact "a" is in operative relation to contact 202a all four of the change return magnets 30 are in operative relation to the contacts b—c—d—e to effect the return of one to four nickels in change, according to the amount of coin units inserted in excess of the one unit required to place the motor starting magnet 208 in condition for selective operation. Adjustment of the block 230 to place the contact "b" in operative relation to contact 202a, requiring the insertion of two coin units for motor starting cuts out the change magnet 30e from contact "e" to reduce by one unit the amount of change returnable, the coin units returnable in change being correspondingly reduced as the number of coin units required for motor starting is increased so that the sum of the coin units required for motor starting and of the coin units returnable in change is always equal to the number of coin units inserted, not exceeding five coin units totaling twenty-five cents. It is impossible to actuate any selective means to effect the ejection of the article unless an amount of coin is inserted equal to the price for which the selective contact means 32 is set.

The operation of the change makers is also under the control of the master mechanism 34 through contacts b—c—d—e so that each coin unit inserted representing a balance of credit returnable in change sets the circuit of one of the change makers for selective operation. For example, if the apparatus is set to require the insertion of three coin units for motor starting, and two dimes are inserted in the apparatus, only one of the two available change makers is closed to the negative side of the line through contact "d" upon selective operation, and hence only one nickel is returned as change. If a quarter were inserted, two nickels would be returned, since the contacts "d" and "e" are then closed to the negative side of the line.

If the operator after inserting a certain amount in coins decides that he does not want any of the articles sold, or finds, that none of the articles displayed are sold for the amount inserted he can effect the return of the coins from receptacle 38 by depression of the push button 18a actuating door 348. This operation resets the apparatus and precludes the possibility of ejecting an article after obtaining the return of the money.

The operator upon selecting an article depresses the corresponding button 18 therefor which causes the member 222 on said push button to depress the contacts 218a to 218e to close the motor and change making circuits and lock the button in depressed position.

The depression of the push button 18 moves the corresponding ejector slide 16 rearwardly to position the pin 268 carried thereby in the path of the aligned arm or cam 274 carried by the common actuating shaft 276 operated from the motor 22. The crank 327a and the connection of the link 327 to the rotatable member 302 is such as to cause the arm 274 to swing back and forth through an arc of 115 degrees, more or less, as the member 302 rotates through one revolution. As the arm 274 swings upwardly it engages the pin 268 to move the corresponding slide 16 rearwardly to effect the article ejecting operation, tensioning the spring 272. As the arm 274 returns, the spring 272 causes the return of the slide 16 into engagement with the inner end of the push button 18 which is still held depressed by the tensioned spring 272, although the slide 250 at this point unlocks the depressed button 18. Snap retraction of the slide 16 is prevented because the slide 16 returns with the pin 268 thereon in engagement with the arm 274. As the tension on spring 272 reduces the push button 18 and slide 16 return together to normal position under the action of the spring actuated button returning means 278.

The depression of the push button 18 to effect said ejecting operation, closes the motor circuit and the circuits of the magnets 30 through a common pair of contacts 264 to insure simultaneous operation thereof. The motor upon starting then immediately closes its own independent circuit through contacts 320.

As the arm 274 starts to return, the apparatus is operated automatically by the motor, as above described, to first open the door 350 of the coin recceptacle 38 to discharge the coins therefrom and to reset the master totalizing mechanism 34 and change slides 28, and then to return the slide 250 to release the depressed button 18, the circuit of the motor 22 remaining closed through contacts 320 after the other circuit thereof through contacts 264 is opened, insuring completion of the resetting operation before the motor is deenergized. After the resetting operation the contacts 326 close to retard the motor and the motor circuit opens at the contacts 320.

The apparatus embodying my invention is operated by the coins to set the circuits for selective operation, and by merely depressing a selected push button 18, the apparatus operates automatically to eject the selected article and any change and to reset.

The master totalizing contact controlling means 34 is responsive to one or more coins of various denominations insertable in the apparatus in combinations not exceeding a predetermined amount, and includes provision for preventing excess coins from actuating the same and remaining in the apparatus without giving value received, said master means 34 preferably controlling to effect return of excess coins the circuits of the slug eliminators 116, 116a and 116b which prevent the apparatus from being fradulently operated by spurious coins or slugs.

The master circuit controlling mechanism 34 and the change maker mechanism 30 are common to any suitable number of selectively operated push button actuated means 32, one associated with each compartment for receiving the articles to be vended, and the price adjustment at each means 32 may be made without requiring any change in said mechanisms 34 and 30.

The push buttons 18, 18a are disposed to prevent more than one being operated at a time, and upon depression of any article selecting button 18 thereof, the same is locked, when the motor starts, in depressed position to prevent a reselection by depression of another button 18 and to prevent depression of the button 18a to effect the manual return of any inserted coins.

Each of the selective controls 32 is adjustable to set the price at which each article is to be vended and to determine the amount of change to be returned, and this adjustment particularly when one or more of the various selective mechanisms have the auxiliary sub-unit change makers 284 associated therewith as above described, renders the apparatus adapted to vend the same or different articles over a flexible range of prices as above described.

In my invention the circuits of the motor and change makers are closed to insure positive operation by actuation of the relay magnet 208 in a separate circuit controlled by the push buttons 18. Hence, the motor and change making circuits are beyond the control of the operator once the same are closed by the relay circuit. The circuits of the magnets 30 are closed to one side of the line by selective actuation of the push buttons 18 before the motor starting magnet 208 is actuated to close the independent contacts 264 which close the motor circuit and the circuit of said magnets 30 to the other side of the line to simultaneously actuate the magnets 30 and start the motor 22.

In the present invention, the operation of the motor effects the ejection of the articles from the compartments through a common ejector slide actuating means 20, and each push button 18 is relied on to place its associated ejector slide 16 thereof in operative relation to said common actuating means simultaneously with the closing of the motor circuit by said push button, the other slides 16 remaining in inoperative relation to said actuating means 20 incapable of being moved into operative relation thereto by the other push buttons.

Having thus described my invention what I claim and desire to secure by Letters Patent is:

1. In a vending apparatus, a plurality of article ejecting elements, a common actuating means therefor including electrically operated motor means, a circuit therefor, a master coin operated circuit controlling means for setting the circuit of said motor means, and selectively operable means associated with each of said article ejecting elements, each of said last named means being actuated to move the associated article ejecting element into operative relation to said common actuating means, and circuit controlling means actuated by said selectively operable means to complete the circuit of said motor means.

2. In a check controlled apparatus, a plurality of electrically operated devices, a corresponding number of circuits for said devices connecting the same in the line in parallel relation to each other, coin actuated mechanism totalizing in units of coin value, contact means actuated thereby for closing the parallel circuit portions at certain points, one of said circuit portions being closed for each unit of coin value totalized, contact means for closing said parallel circuit portions at other points, and manual means common to the second named contact means and operable to close the same for causing actuation of one or more of said devices.

3. In a check controlled apparatus, a plurality of article ejecting means, a common electrically operated means for actuating said article ejecting means, electrically operated means for returning change, circuits for said several electrically operated means connecting the same in the line in parallel relation, coin actuated mechanism totalizing in units of coin value, contact means actuated thereby for closing the parallel circuit portions at certain points, one of said circuit portions being closed for each unit of coin value totalized, a plurality of selectively operable means for placing said article ejecting means individually into operative relation to the actuating means therefor, and contact means associated with and actuated by each of said selectively operable means for closing said parallel circuit portions at other points.

4. In a check controlled apparatus, a plurality of article ejecting means, a common electrically operated means for actuating said article ejecting means, a plurality of electrically operated change returning means, a corresponding number of circuits for connecting said several electrically operated means in the line in parallel relation to each other, contact means for closing said parallel circuit portions at certain points, coin actuated mechanism totalizing in units of coin value and operating said contact means to close one of said circuit portions for each unit of coin value totalized, a plurality of selectively operable members for placing said article ejecting means individually into operative relation to the actuating means therefor, and contact means associated with each of said selective members to be actuated thereby for closing the parallel circuit portions at other points.

5. In a vending apparatus, motor actuated article ejecting means, a plurality of change returning means, circuits for said ejecting and change returning means, a coin operated master mechanism actuated to totalize in units of coin value, said mechanism being actuated in response to certain of the coin units for setting the motor circuit and being actuated in response to each additional coin unit for setting the circuit of one of said change returning means, and manually operated means for controlling said circuits to start the operation of the motor and to actuate said change returning means in accordance with the number of the coin units totalized by said master mechanism in excess of those required for motor starting.

6. In a vending apparatus, a coin operated mechanism including coin delivering means, said mechanism being actuated by the coin or coins delivered to totalize in units of coin value to set the apparatus, and means for controlling the passage of coins through said coin delivering means to said mechanism, said last named means being controlled by said mechanism to by-pass around said mechanism any coin totalizing in excess of a predetermined amount.

7. In a vending apparatus, a coin operated mechanism including a coin delivering means, said mechanism being actuated by the coin or coins delivered to totalize in units of coin value to set the apparatus, electrically operated means for preventing the passage of spurious checks through said coin delivering means to said mechanism, and means actuated by said mechanism and controlling the circuit of said electrically operated means upon the totalization of a predetermined sum by said mechanism to cause any excess coin inserted to follow the path of the spurious checks.

8. In a vending apparatus, a coin operated mechanism including a plurality of chutes for the insertion of coins of various denominations, said mechanism including circuit controlling means each actuated by a coin of a different denomination and collectively totalizing in units of coin value each equal to the coin of lowest denomination receivable and limited in operation to the number of coin units in the coin of largest denomination receivable, means operated by said mechanism for returning the coins of each denomination totalizing in excess of the maximum coin value insertable and circuits controlled by said mechanism for setting the apparatus for operation, said circuits corresponding in number with the number of coin units totalized.

9. In a vending apparatus, article ejecting means including an electric motor, electrically operated change returning means, a coin operated mechanism for setting the circuits for starting said motor and actuating said change returning means, said mechanism being actuated by the coin or coins to totalize in units of coin value, and manually operated means for completing the circuits for starting the motor and actuating said change returning means, said last named means including an adjustable means for varying the number of coin units required for motor starting and for inversely varying the number of coin units available for the return of change.

10. In a vending apparatus, article ejecting means including an electric motor, circuits therefor including a plurality of terminals having parallel connections with one side of the line and a terminal in said circuit associated with said first named terminals, coin operated mechanism for controlling said connections, said mechanism being actuated by the coin or coins to totalize in units of coin value and close said connections, one connection being closed for each coin unit totalized, a contact member adjustable to various positions relative to said first named terminals to engage any one thereof, and a manually operable contact connected to said second named terminal and engageable with said adjustable contact in any position thereof to complete the motor starting circuit.

11. In a vending apparatus, article ejecting means including an electric motor, and a plurality of electrically operated change returning means, circuits therefor including a plurality of terminals having connections to one side of the line, and a corresponding number of associated terminals one in the circuit for starting the motor and the others respectively in the circuits of the several change returning means, a coin operated mechanism for controlling said connections and actuated by the coin or coins to totalize in units of coin value and close said connections, one connection being closed for each coin unit totalized, a member having a corresponding number of contacts engageable with said first named set of terminals, said member being adjustable relative thereto to cause the first of said contacts to engage any one of said first named terminals and to cause one or more of the remaining contacts to disengage the remaining of said first named terminals, and a corresponding number of movable contacts connected to said second named set of terminals and engageable with the contacts on said adjustable member in any position thereof.

12. In a vending apparatus, a coin operated master mechanism actuated by coins of various denominations to totalize in coin units corresponding to the coin of lowest denomination receivable, means controlled by said mechanism to limit the operation thereof to a predetermined number of coin units, an electric motor for operating the apparatus, electrically operated means for returning coins of the lowest denomination received as change in number equal to one less than the number of coin units capable of being totalized, and circuits for said motor and said change returning means, said circuits being set for operation by said master mechanism in accordance with the number of coin units totalized thereby, and manually operated means for completing said circuits.

13. In a vending apparatus, a coin operated master mechanism actuated by coins of various denominations to totalize in coin units corresponding to the coin of lowest denomination receivable, means controlled by said mechanism to limit the operation thereof to a predetermined number of coin units, an electric motor for operating the apparatus, a plurality of electrically operated means for returning coins of the lowest denomination received as change in number equal to one less than the number of coin units capable of being totalized, circuits for said motor and several change returning means, said circuits being set for operation by said master mechanism, one circuit being set for each coin unit totalized, manually operated contact means for completing said circuits, and adjustable means associated with said manual means to relatively position the contacts thereof to vary the number of coin units required to set the motor starting circuit and to inversely vary the number of coin units capable of being returned as change.

14. In a vending apparatus, article ejecting means including an electric motor, a circuit therefor, coin operated means for setting said circuit, manually operable contact means for controlling said circuit to start the motor, and means actuated electrically upon actuation of said manual contact means for locking said manual contact means in circuit closing position.

15. In a vending apparatus, a plurality of article ejecting members, common actuating means therefor including an electric motor, a circuit therefor, a master coin operated mechanism for setting said circuit for selective operation, a plurality of selectively operable members, each operable to complete said circuit to start the motor and to place a corresponding ejecting member in position to be actuated, means associated with said selective members to prevent more than one thereof being actuated at a time, and means for locking the actuated selective member in depressed position when the motor starts.

16. In a vending apparatus, a plurality of article ejecting members, common actuating means therefor including an electric motor, a master coin operated mechanism for setting the motor circuit for selective operation, a plurality of selectively operable members, each operable to complete the motor circuit and to place one of the ejecting members in operative relation to said common actuating means, means associated with said selective members to prevent more than one thereof to be actuated at a time, and means common to said selective members and actuated electrically by the motor starting operation to lock the actuated member in depressed position.

17. In a vending apparatus, a plurality of article ejecting members, power operated means for actuating said ejecting members, coin operated means for setting said power operated means for selective operation, selectively operable slidable members each associated with one of said ejecting members to place the same in operative relation to said actuating means and to start the operation thereof, each of said slidable members having spaced openings therein, means associated with said selective members to prevent more than one thereof being actuated at a time, and a transverse slide having openings therein slidably receiving said selective members and having tongues adapted to enter one opening or the other of each of said selective members, and means for actuating said slide simultaneously with the starting operation to lock the actuated selective member in depressed position.

18. In a vending apparatus, a motor operated article ejecting means including a motor circuit having normally open contacts, a relay circuit including electromagnetic means, coin operated means for setting said relay circuit, manually operated means for completing said relay circuit, and means actuated by said electromagnetic means for locking said manual means, and actuating said contacts to close the motor circuit.

19. In a vending apparatus, a motor operated article ejecting means, electrically operated change returning means, circuits for said motor and said change returning means including a common portion having a pair of normally open contacts, a relay circuit having electrically operated means for closing said contacts to simultaneously complete the motor and change returning circuits, coin operated means for setting change and relay circuits, and contact means operable to complete said circuits.

20. In a vending apparatus, a motor operated article ejecting means, a plurality of electrically operated change returning means, circuits for said motor and said change returning means including a common portion having a pair of normally open contacts, said change returning circuits including portions each normally open at a plurality of points, a relay circuit including electrically operated means for closing said contacts and including a portion normally open at a plurality of points, coin operated mechanism actuated to totalize in units of coin value to close said relay circuit at one point and to close said change returning circuits each at one point, certain of said totalizing actions being effective in setting the relay circuit, and remainder thereof being effective in setting one or more of the change returning circuits, and manually operable means for closing the change returning circuits at the remaining of said open points thereof, and for completing said relay circuit at the remaining open point thereof to cause simultaneous operation of the motor and the change returning means by closing of said contacts in the common portion of the circuits thereof.

21. In a vending apparatus, individual article ejecting elements, common actuating means therefor including an electric motor, a plurality of contact controlled circuits for energizing said motor, a relay circuit having electromagnetic means, a coin operated mechanism for setting said relay circuit, a plurality of selectively operable means each movable to place a corresponding ejecting element in operative relation to said actuating means to complete said relay circuit, means to prevent operation of more than one selective means at a time, means operated by said electromagnetic means for locking a selective means in depressed position and closing the contacts of one of said motor circuits, means operated by the motor for closing and opening the contacts of the other motor circuit, and means operated by the motor for resetting said coin operated mechanism and returning said locking means to open the first motor circuit and release the selective means.

22. In a vending apparatus, article ejecting means including an electric motor, electrically operated change mechanism, circuits for said motor and said change mechanism, said circuits including a common portion having contacts, a relay circuit having electromagnetic means, coin operated means for setting said change circuits and said relay circuit for selective operation, selectively operated means for further setting said change circuits and closing said relay circuit, means actuated by said electromagnetic means for locking the selectively operated means in depression position and closing the contacts of said common portion, a separate circuit for energizing the motor closed and opened by operation of said motor, and means operated by the motor for resetting the coin operated mechanism, the change mechanism, and the locking means and for opening the first named circuit of the motor prior to the opening of the second named motor circuit.

23. In a vending apparatus, article ejecting means, means including an electric motor for actuating said article ejecting means, a circuit for said motor, coin actuated mechanism for controlling said circuit to set the motor for operation, manually operable means for controlling said circuit to start the motor, means operated by the motor for resetting the control apparatus, a second circuit for said motor, means operated by the motor for closing and opening said second circuit, and means operated by the motor for controlling the circuit thereof to retard the motor speed as the motor approaches position for opening the second circuit thereof.

24. In a vending apparatus, an article ejecting element, actuating means therefor, a selective member adapted to be depressed to move said article ejecting element into cperative relation to said actuating means, and a spring connecting said element to said member.

25. In a vending apparatus, slidable article ejecting elements, a common actuating means therefor including a transverse shaft having cams thereon, an electric motor for actuating said shaft to swing said cam members back and forth through arcs, coin operated means for setting the motor circuit, slidable selectively operable members each adapted to move one of said ejecting elements into the path of one of said cams, and to complete the motor circuit, a spring connecting each ejecting element with the corresponding selective member, and means for returning each selective member and the corresponding ejecting element to normal position after the disengagement of the corresponding cam from said ejecting element.

26. In a vending apparatus, article ejecting elements, common actuating means therefor, a motor for driving said actuating means, a common change returning means, coin operated means for setting said motor and change returning means for selective operation, selectively operable members each serving to cause the operation of said motor and change returning means and to place the corresponding ejecting element into operative relation to said common actuating means, and auxiliary change returning means associated with certain of said article ejecting elements to be actuated thereby.

27. In a vending apparatus, an article ejecting element, power driven actuating means therefor, means for controlling said actuating means to start the operation thereof including a manually operable member serving to move said article ejecting element into operative relation to said actuating means, a change returning means including an ejecting slide coacting with said article ejecting element, said slide and said element having portions relatively positioned to engage each other when said actuating means undertakes the movement of said article ejecting element and thereby to effect the ejecting of the change.

28. In a vending apparatus, article ejecting elements, a common motor operated means for actuating said ejecting elements, coin operated master mechanism actuated by the coins to totalize in units of coin value to set the motor circuit, electrically operated change returning means having the circuits thereof set for selective operation by said master mechanism and returning change in coins of the unit denomination receivable by said master mechanism, selectively operable means each operable to place one of said ejecting elements in operative relation to said actuating means and to complete the circuits, and auxiliary change means actuated by certain of said ejecting elements for returning as change coins of less value than those of unit denomination.

29. In a vending apparatus, article ejecting means, an electric motor including a circuit for operating said article ejecting means, means for controlling said circuit including coin operated mechanism setting the circuit for operation, means for receiving the coins, manual means for actuating said coin receiving means to return the coins to the operator, and for resetting said mechanism, manual means for completing said motor circuit, and means operated by said motor driven means for actuating said coin receiving means to discharge the coins therefrom to be retained in the apparatus, and for resetting the apparatus.

30. In a vending apparatus, power driven article ejecting means, coin operated mechanism for setting said article ejecting means for selective operation, means for resetting said coin operated mechanism, a receptacle for receiving the coins including closures one adapted to be opened to return the coins to the operator and the other adapted to be opened to discharge the coins to be retained in the apparatus, a selectively operable member for starting the operation of the article ejecting means, a selectively operable member for actuating the first of said closures and said resetting means, means for preventing operation of more than one of said selective members at a time, and means operated by the article ejecting means for opening the other of said closures and actuating said resetting means.

31. In a check controlled apparatus, electrically operated means including a plurality of circuits each having parallel connections to one side of the line, said connections being arranged in sets, circuit controlling means common to the parallel connections of each set, coin operated means for actuating one of said circuit controlling means in steps to successively close said circuits to one side of the line, and coin operated means for actuating the other of said circuit controlling means to simultaneously close said circuits to said side of the line.

32. In check controlled apparatus, electrically operated means including a plurality of circuits, each having parallel connections to one side of the line, said connections being arranged in sets, circuit controlling means common to the parallel connections of each set and including a group of contacts corresponding in number with the number of circuits, said circuit controlling means being adapted to totalize in units of coin value, means operated by coins each having a unit value less than the number of circuits for actuating one of said circuit controlling means for closing said circuits in steps through the corresponding group of contacts to one side of the line in accordance with the number of coin units totalized, and means actuated by a coin having a unit value equal to the number of circuits for actuating the other of said circuit controlling means for closing said circuits simultaneously.

33. In a check controlled apparatus, electrically operated means including a plurality of circuits, circuit controlling means including contacts for said circuits adapted to close said circuits in accordance with the units of coin value inserted in the apparatus, a plurality of electromagnets having armatures, check operated means for closing the circuit of each of said electromagnets, each of said last named means being actuated by a coin of different value and being reset to open the circuit thereof by the operation of the corresponding armature, and unidirectionally operative means interposed between the armatures of said electromagnets and said circuit controlling means for actuating the latter in accordance with the units of coin value inserted in the apparatus.

34. In a check controlled apparatus, electrically operated change returning means including a plurality of circuits corresponding in number with units of coin value to be returned as change, circuit controlling means adapted to totalize in units of coin value to set said circuits for operation in accordance with the coin units inserted in the apparatus to be returned as change, plural means each operated by a coin of different denomination for actuating said circuit controlling means to cause the same to totalize in accordance with the value of the operated coin or coins and means common to said circuits for completing the same.

35. In a check controlled apparatus, a plurality of electrically operated devices including the circuits therefor, a circuit controlling means including relatively movable contact members actuated by a coin smaller than a predetermined value to close portions of said circuits in steps, and circuit controlling means including relatively movable contact members actuated by a coin of predetermined greater value for simultaneously closing said circuit portions.

36. In a check controlled apparatus, electrically operated means including a plurality of circuits, circuit controlling means including relatively movable contact members adapted to totalize in units of coin value and close one or more portions of said circuits, one circuit portion being closed for each coin unit totalized, a plurality of electromagnets each having means actuated by a coin differing from the other in value for closing the circuit thereof, plunger armatures actuated by said electromagnets and serving when actuated to open the circuits of said electromagnets, and means operated by said armatures for actuating said circuit controlling means in accordance with the value of the coin or coins inserted.

37. In a check controlled apparatus, electrically operated means including a plurality of circuits, circuit controlling means including contacts for said circuits corresponding in number therewith, an electromagnet for actuating said circuit controlling means unidirectionally to close the contacts of one or more of said circuits in accordance with the units of coin value inserted, and check operated means for closing the circuit of said electromagnet, said last named means being controlled by the operation of said electromagnet to open the circuit thereof.

38. In a check controlled apparatus, a plurality of circuit closing means each including a stationary member having a group of contacts adapted to be connected in the circuits of the apparatus and a rotary member having contact means adapted to coact with the group of contacts associated therewith, means for electrically connecting said circuit closing means to one side of the line, means operated by coins of certain of the smaller denominations for actuating one of said rotary members in steps to successively close the circuits at the contacts of the group associated therewith in accordance with units of coin value represented by said coin or coins, and means operated by a coin of larger denomination for actuating the other of said rotary members to simultaneously close the circuits at the contacts of the group associated therewith.

39. In a check controlled apparatus, a plurality of circuit closing means each including a stationary member having a group of contacts adapted to be connected in the circuits of the apparatus and a toothed rotary member having contact means adapted to coact with the group of contacts associated therewith, said rotary members being mounted for rotation independently of each other, springs for returning said rotary members to normal position, electromagnets having reciprocatable armatures, coin operated means for closing the circuits of said electromagnets, said electromagnet circuit closing means being operated by coins of different denominations and being automatically operated by said electromagnets to reopen the circuits thereof, a pallet operated by an armature responsive to a coin of smaller denomination and coacting with the teeth of one of said rotary members for actuating said rotary member in steps to successively close the circuits at the contacts of the group associated therewith, another pallet operated by an armature responsive to a coin of greater denomination and coacting with the teeth of the other rotary member to simultaneously close said circuits at the contacts of the group associated therewith, ratchets engaging said teeth to retain said rotary members in position against the tension of said springs, and common means for releasing said ratchets to allow the return of said rotary members.

40. In a check controlled apparatus, coin delivering means, means associated therewith for preventing passage of spurious checks through said coin delivering means, coin operated mechanism totalizing in units of coin value to set the apparatus, and means operated by said mechanism at certain totalizing stages for controlling said second named means to cause the coin to follow the path of the spurious checks, and prevent a totalization in excess of a predetermined amount.

41. In a check controlled apparatus, a plurality of delivery means for coins of different denominations, mechanism actuated by said coins and totalizing in units of coin value to set the apparatus, means associated with each of said coin delivery means for controlling the passage of coins to said mechanism, and means operated by said mechanism for controlling each of said last named means in accordance with the denomination of the coin controlled thereby to prevent operation of said mechanism by any coin totalizing in excess of a predetermined amount.

42. In a check controlled apparatus, a plurality of delivering means for coins of different denominations, mechanism actuated by said coins and adapted to totalize in units of coin value not in excess of a predetermined amount to set the apparatus for operation, means for controlling the passage of coins through each of said delivering means, and means actuated by said mechanism for controlling each of said coin passage controlling means, said last named means and said mechanism being coordinated with reference to the totalization and the denominations of the coins to prevent delivery of any coin to said mechanism totalizing in excess of said predetermined amount.

43. In a check controlled apparatus, a plurality of delivery means each passing a coin of a different denomination, means associated with each of said delivery means for eliminating spurious checks therefrom, mechanism actuated by said coins to totalize not in excess of a predetermined amount, and means operated by said mechanism for controlling each of said spurious check eliminating means to cause any coin totalizing in excess of said predetermined amount to be diverted from said mechanism.

44. In a check controlled apparatus, a plurality of delivery means each for a coin of different denomination, electrically operated devices associated therewith for bypassing spurious checks, a plurality of circuits, means operated in steps by coins smaller than a predetermined denomination for setting said circuits for operation, means operated by the coin of predetermined largest denomination for setting all of said circuits simultaneously, said several coin operated means totalizing in units of coin value and being limited in operation to a predetermined totalization, means operated by said step operated means to open the circuits of said electrically operated devices in proper sequence to bypass any coin totalizing in excess of the predetermined totalization designed for the apparatus, and means operated by said second named coin operated means for opening the circuits of all of said devices simultaneously.

45. In a check controlled apparatus, a plurality of delivery means each passing a coin of a different denomination, electrically operated devices associated with each of said delivery means for eliminating spurious checks therefrom, a plurality of circuits, circuit controlling means operated by said coins to totalize in units of coin value not in excess of a predetermined amount for setting said circuits for operation in accordance with the number of coin units totalized, and means operated by said circuit controlling means for opening the circuits of each of said electrically operated devices for bypassing the coins over the path of the spurious devices, each of said last named means being coordinated with the totalizing operation of said coin operated circuit controlling means in accordance with the denomination of the coin to prevent delivery of any coin to said circuit controlling means totalizing in excess of said predetermined amount.

46. In a check controlled apparatus, a plurality of delivery means each passing a coin of a different denomination, electrically operated devices associated with each of said delivery means for eliminating spurious checks therefrom, a plurality of circuit controlling means each including a stationary member having a group of contacts adapted to be connected in the circuit of the apparatus and a rotary member having contact means adapted to coact with the group of contacts associated therewith, means for electrically connecting one of said circuit controlling means to the other and both to one side of the line, means operated by certain of the coins for actuating one of said rotary members in steps to successively close the circuits at the contacts of the group associated therewith, contacts controlled by said step operated rotary member to control said electrically operated devices in a sequence beginning with the electrically operated device for the coin of largest denomination and cause the coins to pass out over the path of the spurious checks to prevent a totalization in excess of a predetermined amount, means operated by the coin of largest denomination for actuating the other of said rotary members to simultaneously close the circuits at the contacts of the group associated therewith, and contact means controlled by said last mentioned rotary member to open the electrical connection to the other circuit controlling means and simultaneously control said several electrically operated devices for bypassing any coins inserted thereafter to prevent actuation of the apparatus thereby.

47. In a check controlled apparatus, a plurality of delivery means for coins of different denominations, coin operated circuit controlling mechanism associated therewith, said mechanism totalizing in units of coin value each equal to the coin of lowest denomination receivable and limited in operation to the number of coin units in the coin of largest denomination receivable, and electrically operated devices corresponding in number with the number of coin units capable of being totalized and having circuits controlled by said mechanism, one of said circuits being set for operation for each unit operation of said mechanism, and means common to said circuits for simultaneously completing the circuits set for operation by said coin mechanism.

48. In a vending apparatus, an electrically operated device having a circuit portion, a plurality of circuit portions in parallel relation to each other, contact means for closing said parallel circuit portions, coin actuated mechanism totalizing in units of coin value for operating said contact means to close one of said parallel circuit portions for each unit of coin value totalized, a plurality of selectively operable means for controlling the connection between said electrically operated device and said parallel circuit portions, and adjustable means associated with each of said selectively operable means for placing any one of said parallel circuit portions into operative relation to the circuit portion of said electrically operated device.

49. In a vending apparatus, an electrically operated device having a circuit portion, a plurality of associated circuit portions, coin operated mechanism for setting said associated circuit portions in accordance with the number of units of coin value inserted, adjustable means for placing any one of said associated circuit portions into operative relation to said first named circuit portion, and manually operable means adapted to engage said adjustable means in any adjusted position thereof for completing the circuit of said electrically operated device.

50. In a vending apparatus, a plurality of circuit portions, coin operated means totalizing in units of coin value and setting one of said circuit portions for each unit operation of said coin operated means, a circuit portion for controlling article ejecting means, contact means adjustable to place any one of said first named circuit portions in operative relation to said last named circuit portion, and a contact in circuit with said last named circuit portion and movable into engagement with said adjustable contact means in any position thereof.

51. In a vending apparatus, a plurality of article ejecting elements, a common electrically operated device for actuating said elements, a plurality of electrically operated change returning devices, circuit portions for said electrically operated devices, a corresponding number of associated circuit portions, coin operated means for setting said associated circuit portions in accordance with the units of coin value inserted in the apparatus, a plurality of selectively operable members each associated with a corresponding ejecting element for placing the same into operative relation with the actuating means therefor, and a plurality of sets of movable contacts in circuit with said first named circuit portions and cooperating with said second named circuit portions, each set of said last named contacts being actuated by a corresponding selectively operable member.

52. In a vending apparatus, a plurality of article ejecting elements, a common electrically operated means for actuating said elements, a circuit for said actuating means, coin operated means for setting said circuit, a plurality of selectively operable members each associated with a corresponding ejecting element for placing the same into operative relation with said actuating means, and contact means associated with each of said selectively operable members and actuated thereby to complete said circuit.

53. In a vending apparatus, a plurality of electrically operated devices having circuit portions in parallel relation to each other, a corresponding number of associated parallel circuit portions having terminals, coin operated mechanism for setting said associated circuit portions in accordance with the number of units of coin value inserted, a member having contacts engageable with the terminals of said associated circuit portions, said member being adjustable to disengage one or more of said terminals, and a plurality of movable contacts in circuit with said first named circuit portions and engageable with the contacts of said adjustable member to bridge one or more pairs of the associated circuit portions according to the adjustment of said member.

54. In a vending apparatus, a plurality of article ejecting elements, a common motor operated means for actuating said elements, a circuit portion for controlling said motor actuated means, a plurality of associated circuit portions, coin operated mechanism for setting said associated circuit portions in accordance with the units of coin value inserted in the apparatus, a selectively operable member for placing each of said ejecting elements into operative relation to said motor operated means, a plurality of adjustable members each having a contact adapted to be engaged with any one of said associated circuit portions, and a plurality of movable contacts in circuit with said first named circuit portion, each of said last named contacts cooperating with the contact of a corresponding one of said adjustable members and being actuated by a corresponding selectively operable member.

55. In a vending apparatus, a plurality of article ejecting elements, a common electrically operated means for actuating said elements, a plurality of parallel circuit portions, coin operated means for closing said circuit portions in accordance with the number of units of coin value inserted in the apparatus, an associated circuit portion, adjustable means for placing any one of said first named circuit portions in operative relation to said last named circuit portion, a plurality of selectively operable members each associated with a corresponding ejecting element for placing the same in operative relation to said actuating means, and contact means associated with each of said selectively operable members and actuated thereby for completing the circuit through the operatively related circuit portions for causing operation of said actuating means.

56. In a check controlled apparatus, a plurality of parallel terminal portions to one side of the line, coin operated means for closing said terminal portions in accordance with the number of coin units inserted in the apparatus, guideways disposed transversely of said terminal portions, a block slidably disposed within said guideways, contacts secured upon said block at the inner side thereof and relatively disposed so that the successive contacts engage the successive terminal portions in one position of said block, said block being adjustable to cause the first of said contacts to successively engage said terminal portions and one or more of the remaining contacts to disengage said terminal portions, conductive portions at the outer side of said block in circuit with the corresponding inner contacts, a plurality of electrically operated devices having circuit portions corresponding in number with said first named terminal portions, and a movable contact connected with each of said second named circuit portions, said movable contacts being arranged in front of said block and adapted to be manually moved into engagement with the corresponding conductive portions in any position of said block.

57. In a vending apparatus, electrically operated article ejecting means, electrically operated locking means, a control circuit for said several means, coin operated means for setting said circuit, and manually operable contact means for completing said circuit to actuate said electrically operated ejecting and locking means, said contact means when actuated coacting with said locking means to be retained thereby in circuit closing position.

58. In a vending apparatus, an article ejecting element, motor operated means for actuating said element, a control circuit for said motor, an electrically operated locking member controlled by said circuit, coin operated means for setting said circuit, a manually operable member for placing said ejecting element in operative relation to said actuating means, and contacts actuated by said manual member for closing said control circuit for starting the motor and locking said manual means in circuit closing position.

59. In a vending apparatus, a plurality of article ejecting members, common actuating means therefore including an electric motor having a circuit, a relay circuit for controlling said motor circuit, coin operated means for setting said relay circuit for selective operation, a plurality of selectively operable members, each operable to complete the relay circuit to start the motor and to place a corresponding ejecting member in position to be actuated, means associated with said selective members to prevent actuation of more than one thereof at a time, and means common to said selective members and actuated electrically by closing of said relay circuit to lock the actuated member in circuit closing position.

60. In a vending apparatus, article ejecting means including a motor having a plurality of circuits, one of said circuits being closed and opened by the operation of the motor, a relay circuit for controlling the other motor circuit, a locking member controlled by said relay circuit, coin operated means for setting said relay circuit for operation, manually operable means for completing said relay circuit to start the motor and actuate said locking member, said manual means being retained in circuit closing position by said locking member, and means operated by the motor while energized through the self controlled circuit for releasing said manual means and opening the relay controlled motor circuit.

61. In a vending apparatus, a slidable article ejecting element, actuating means including a motor operated arm engageable with said element and swingable back and forth through an arc, a manually operable actuating member adapted to move said element into operative relation to said arm, a spring connecting said element and said manual member, means operated by said manual member for starting the motor and locking said manual member in depressed position, means operated by the motor after the ejecting operation for releasing said manual member, and means for returning the manual member and ejecting element to normal position.

62. In a vending apparatus, a motor operated article ejecting means, a plurality of electrically operated change returning means, circuits for said motor and said change returning means including a common portion having a pair of normally open contacts, a relay circuit having electrically operated means for closing said contacts to simultaneously complete the motor and change returning circuits, coin operated means for closing portions of said relay and change returning circuits to one side of the line in accordance with the number of unit operations of said coin operated means, and a plurality of jointly actuated manually operable contact means for closing said change returning circuits at other points and closing said relay circuit, the manual contact for the relay circuit being disposed to delay the closing thereof relative to closing of the other jointly actuated contacts.

63. In a vending apparatus, an electric motor for actuating article ejecting means, a plurality of electrically operated change making devices, circuits for said motor and said devices including a common portion having normally open contacts, a relay circuit including electrically operated means for closing said contacts, coin operated circuit controlling means totalizing in units of coin value for setting for operation said relay circuit and one or more circuit portions of said change making devices in accordance with the number of coin units inserted in the apparatus in excess of those required for setting the relay circuit, and a plurality of jointly actuated contacts for controlling said change making circuits and said relay circuit, said contacts when actuated rendering operative change making devices corresponding to any excess units of coin value totalized, and energizing said relay circuit to simultaneously actuate said motor and any such operative change making devices.

64. In a vending apparatus, article ejecting elements, a motor, rotary cam members driven by said motor, a circuit for starting said motor, coin operated mechanism for controlling said circuit, means for resetting said mechanism, a second motor circuit including contacts controlled by one of said cam members, motor retarding means under control of the other cam member and becoming operative in advance of the opening of the second motor circuit, common actuating means for said ejecting elements, said actuating means including a shaft having arms thereon and a crank connection with one of said rotary cam members, selective means for placing each of said ejecting elements into operative relation to said common actuating means and for starting the motor operation, and means operated by one of said rotary cam members for actuating said resetting means.

65. In a vending apparatus, article ejecting elements, common actuating means therefor, a motor having a plurality of circuits, a relay circuit for controlling one of said motor circuits to start the motor, coin operated mechanism for setting said relay circuit for selective operation, means for resetting said mechanism, selectively operable members for placing said ejecting elements into operative relation to said actuating means and completing the relay circuit to close one of the motor circuits, means operated by the motor for closing and opening the other motor circuit, means operated by the motor for actuating said resetting means, and means operated by the motor for retarding the speed thereof as the self controlled motor circuit opens.

66. In a vending apparatus, article ejecting elements, common actuating means therefor, a motor having a plurality of circuits, a relay circuit including means for closing one of said motor circuits, means operated by the motor for closing and opening the other motor circuit, coin operated mechanism for setting said relay circuit, means for receiving the coins, means for resetting said mechanism, a manually operable member for actuating said coin receiving means and said resetting mechanism, manually operable members for placing said ejecting elements into operative relation to said common actuating means and completing the relay circuit, means for preventing operation of more than one of said manually operable members at a time, and means operated by the motor for actuating said resetting means and said coin receiving means.

FAIRFIELD W. HOBAN.